US012591147B1

(12) United States Patent
Sharma et al.

(10) Patent No.: US 12,591,147 B1
(45) Date of Patent: Mar. 31, 2026

(54) CURVED SURFACE LAMINATION

(71) Applicant: Meta Platforms Technologies, LLC, Menlo Park, CA (US)

(72) Inventors: Prithu Sharma, Bothell, WA (US); Alan Kleiman Shwarsctein, Saratoga, CA (US); Adar Magen, Sunnyvale, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 382 days.

(21) Appl. No.: 18/296,686

(22) Filed: Apr. 6, 2023

Related U.S. Application Data

(60) Provisional application No. 63/329,300, filed on Apr. 8, 2022.

(51) Int. Cl.
| | |
|---|---|
| *G02C 7/02* | (2006.01) |
| *G02B 27/01* | (2006.01) |
| *G06F 1/16* | (2006.01) |

(52) U.S. Cl.
CPC ........... *G02C 7/02* (2013.01); *G02B 27/0172* (2013.01); *G06F 1/163* (2013.01); *G02B 2027/0178* (2013.01); *G02C 2202/16* (2013.01)

(58) Field of Classification Search
CPC .. G02C 7/02; G02C 2202/16; G02B 27/0172; G02B 2027/0178; G06F 1/163
See application file for complete search history.

(56) References Cited

U.S. PATENT DOCUMENTS

| | | | | |
|---|---|---|---|---|
| 5,399,227 | A | * | 3/1995 | Abrams .............. B29C 65/1406 |
| | | | | 156/99 |
| 10,881,287 | B1 | | 1/2021 | Ouderkirk et al. |
| 11,614,638 | B1 | | 3/2023 | Sharma et al. |
| 2005/0056953 | A1 | * | 3/2005 | Hofmann ......... B29D 11/00125 |
| | | | | 264/1.32 |
| 2007/0209393 | A1 | * | 9/2007 | Miller .................... G02C 7/101 |
| | | | | 65/17.6 |
| 2016/0318147 | A1 | * | 11/2016 | Meschenmoser ........................... |
| | | | | B29D 11/00942 |
| 2018/0085857 | A1 | | 3/2018 | Gupta et al. |
| 2019/0171030 | A1 | | 6/2019 | Kriman et al. |
| 2019/0377184 | A1 | * | 12/2019 | Sharp .................. G02B 27/283 |
| 2020/0142540 | A1 | | 5/2020 | Rahmani et al. |
| 2020/0301168 | A1 | * | 9/2020 | Traina ................ B24B 13/0057 |
| 2020/0310569 | A1 | | 10/2020 | Kleiman-Schwarsctein et al. |
| 2021/0132349 | A1 | * | 5/2021 | Khan ............. G02B 27/0172 |
| 2021/0263319 | A1 | * | 8/2021 | Dimov ............. G02B 27/0172 |
| 2022/0011595 | A1 | | 1/2022 | Jenkins et al. |

* cited by examiner

*Primary Examiner* — Collin X Beatty

(74) *Attorney, Agent, or Firm* — Greenberg Traurig, LLP

(57) ABSTRACT

In some examples, a method may include applying a force to the curved surface of the lens assembly using at least one deformable element to adhere the lens assembly to a functional stack to form a laminated combination. Example methods may be used to fabricate apparatus such as an augmented reality or virtual reality device using the laminated combination. The curved surface may have a curvature based on an ophthalmic prescription for a user. Example methods and apparatus may relate to the fabrication of head-mounted devices including prescription-based optics. Other devices, methods, systems, and computer-readable media are also disclosed.

20 Claims, 16 Drawing Sheets

SPH-2                    SPH-3    610          SPH-4    620

600

**Bubble Free Lamination
Demonstrated**

900

922

910

920

1000

Pressure Sensitive Paper Shows Good Distribution

1200

1220

1210

1230

1300

1310

1320

1400

Side View

1430

1410

Soft Fixtures

Actuator N

Actuator N+1

1420

1440

Multi-Body Soft Fixture

Top View

1450

CURVED SURFACE LAMINATION

CROSS REFERENCE TO RELATED APPLICATION

This application claims the benefit of U.S. Provisional Application No. 63/329,300, filed Apr. 8, 2022, the disclosure of which is incorporated, in its entirety, by this reference.

BRIEF DESCRIPTION OF DRAWINGS

The accompanying drawings illustrate a number of exemplary embodiments and are a part of the specification. Together with the following description, these drawings demonstrate and explain various principles of the present disclosure.

FIG. 14A shows a side view and FIG. 14B shows a top view.

Figure 1:
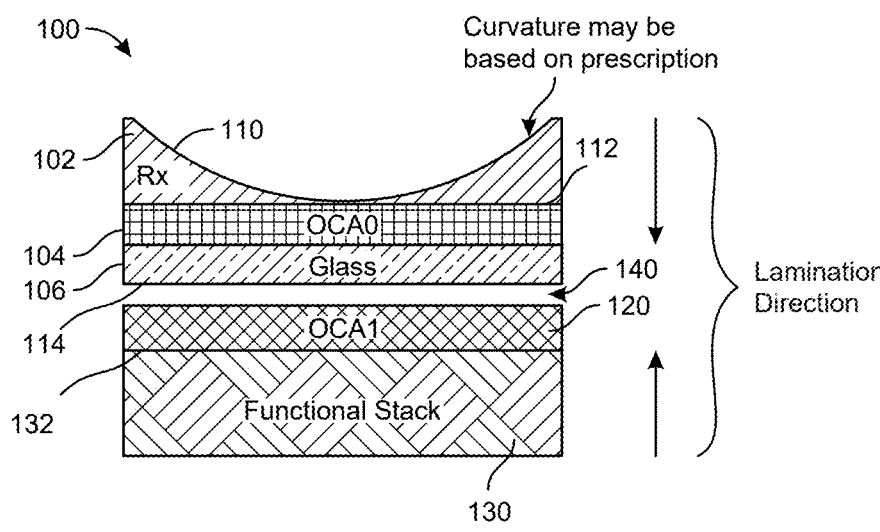
FIG. 1 shows a lens assembly including a prescription lens located proximate a functional stack according to some examples.

Throughout the drawings, identical reference characters and descriptions indicate similar, but not necessarily identical, elements. While the exemplary embodiments described herein are susceptible to various modifications and alternative forms, specific embodiments have been shown by way of example in the drawing and are described in detail herein. However, the exemplary embodiments described herein are not intended to be limited to the particular forms disclosed. Rather, the present disclosure further covers all modifications, equivalents, and alternatives falling within the scope of the appended claims.

DETAILED DESCRIPTION OF EXEMPLARY EMBODIMENTS

Augmented reality and/or virtual reality (AR/VR) devices may include one or more prescription lenses customized for a particular user. Prescription lenses may be made to order, but lens curvature may vary widely. For example, there may be over 287,000 possible prescription lens configurations using typical spherical ($-4$ D to 0.5 D) and cylindrical ($-2$ D to 0 D) power increments, where D represents diopters.

In some examples, a prescription lens may be a plano-convex lens or a plano-concave lens. The planar surface of the lens may be optionally adhered to a planar substrate, such as a glass substrate. A lens assembly may include at least one prescription lens and may optionally further include a substrate such as a glass substrate (e.g., a substrate adhered to a planar surface of the prescription lens), an adhesive layer (e.g., allowing lamination to a functional stack), and/or a protection layer (e.g., to provide mechanical and/or chemical protection to the curved surface of the prescription lens.

In some examples, a lens assembly may include a prescription lens and a planar substrate. In some examples, the planar substrate may be omitted. A lens assembly may further include one or more additional layers or coatings.

In some examples, a lens assembly may be laminated to a functional stack. In this context, a functional stack may include an optical configuration configured to direct light from a display to the eye(s) of a user through the functional stack and then further through lens assembly. A functional stack may also be referred to as an optical stack. The lens assembly may allow the optical properties of a device including the functional stack to be modified based on, for example, an ophthalmic prescription of a user of the device.

Examples include fabrication of an AR/VR device including lamination of a lens assembly to a functional stack. The lens assembly may have a curved surface (where the curvature may depend on the prescription of the lens) and a planar surface. The planar surface may be laminated to a planar surface of the functional stack through the application of pressure and an adhesive (e.g., a pressure-sensitive adhesive) located between the lens assembly and the functional stack.

Lamination of the lens assembly to the functional stack may include application of a generally uniform pressure over the curved surface of the lens assembly. The curved surface of the lens assembly may have a curvature that varies greatly from lens assembly to lens assembly, depending on the prescription used for the lens. One approach may be to use a customized fixture for each prescription lens curvature encountered during production. However, this would be difficult to manage and implement in a high volume environment and may be expensive if thousands of customized fixtures are required.

Examples include methods and apparatus that are configured to allow a uniform pressure to be applied over a curved surface (e.g., of a prescription lens) and to adapt to wide variations in surface curvature. Example advantages of the described approaches may include at least one of scalability, cost savings, easier build management, or faster throughput.

Described approaches may reduce the possibility of damage to lens surfaces. Example approaches may allow fabrication of AR/VR devices including a prescription lens, where the prescription lens may have a full range of prescription curvatures.

Example approaches include methods and associated apparatus that allow components with variable curvature to be integrated into a device, such as an AR/VR device. Application of a uniform pressure over a curved surface, for a range of possible curvatures, allows reduction in the prevalence of multiple defects, such as lamination bubbles, optical non-uniformity (e.g., a variable thickness adhesive layer), poor adhesion in certain areas, and other problems.

FIG. 1 shows a lens assembly 100 including a lens 102 (e.g., a prescription lens labeled Rx), a lens adhesive layer 104, and a substrate 106. In some examples, the lens 102 may have a curved upper surface 110 (as illustrated) and a planar lower surface 112. The prescription lens may be adhered to the substrate 106 using the lens adhesive layer 104. The lens adhesive layer 104 may include an optically clear adhesive (OCA, denoted OCA0). The lens assembly 100 may have a lower surface 114, which may be a planar surface.

The lens assembly 100 is shown located proximate a functional stack 130. The functional stack 130 may include one or more lenses, waveguides, filters, reflectors, beam-splitters, polarizers, and/or the like. The configuration of the functional stack is not shown here in detail and is discussed further below. The approaches described herein may be used with various configurations of functional stack 130. The functional stack 130 may have a planar upper surface 132 (e.g., provided by a planar glass substrate such as a window, or lens or other optical element having a planar surface). The functional stack 130 supports an adhesive layer 120, for example, including an optically clear adhesive layer denoted OCA1. In some examples, one or more adhesive layers may be located on the functional stack 130 and/or on the lower surface 114 of the lens assembly.

Any suitable adhesive layer may be used for the lens adhesive layer 104, adhesive layer 120, or any other adhesive layer. An adhesive layer may include one or more coatings formed on the functional stack and/or on the lens assembly.

Lamination of the lens assembly 100 to the functional stack 130 may include urging the lens assembly 100 and functional stack 130 together, for example, as shown by the arrows labelled "Lamination Direction". For example, a force applied to the curved surface 110 of the lens assembly may reduce the separation 140 between the lens assembly and the functional stack 130 to bring the substrate 106 in contact with the adhesive layer 120. In some examples, the optical stack may be secured and the lens assembly may be urged against the optical stack, or vice versa.

Figure 2:
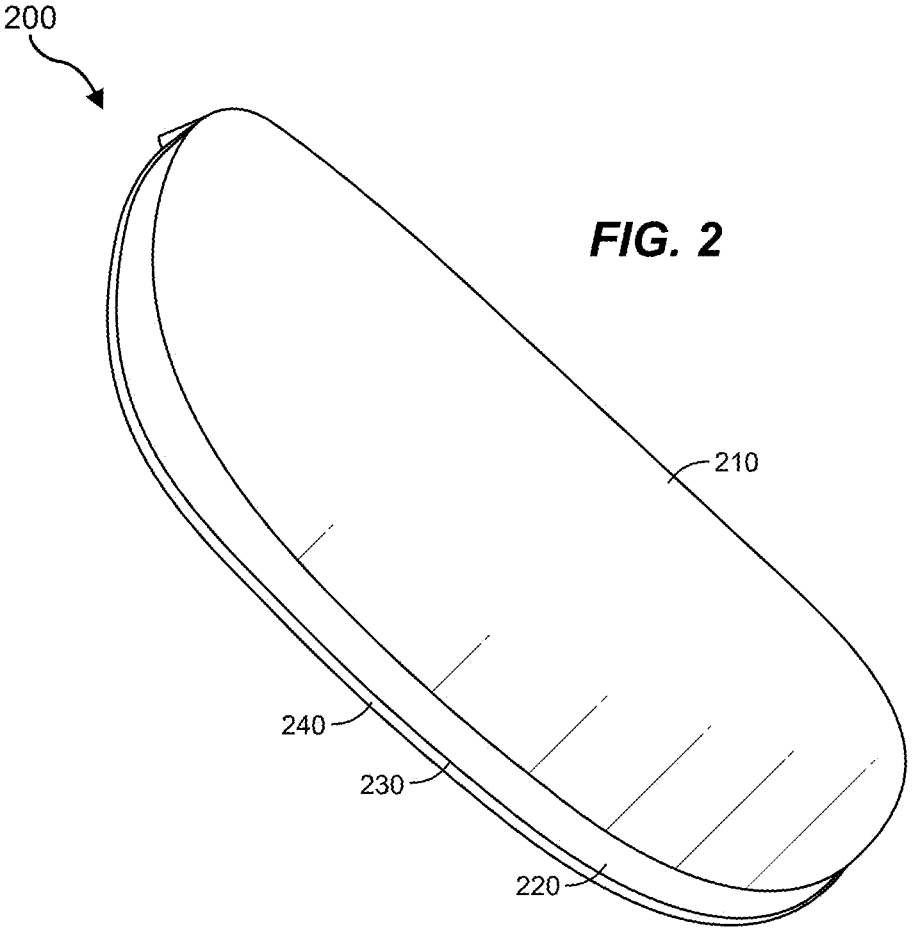
FIG. 2 shows an example prescription lens that may be used in a lens assembly, according to some embodiments.

FIG. 2 shows a lens 200 (e.g., a plano-concave prescription lens) having a curved surface 210, an edge 220, and a planar lower surface 230. The planar lower surface of the lens 200 may be adhered or otherwise bonded to substrate 240, for example, a glass substrate. In some examples, the lens 200 may include a plano-convex lens or any suitable combination of lens elements, and lens 200 may be used in an example lens assembly. The lens 200 may have optical characteristics similar to those of prescription lenses used in eyeglasses. However, in some examples, the prescription lens may be appreciably thinner than those used in conventional eyeglasses. The prescription lens may be adhered to the substrate 240 (e.g., a glass substrate) using an optical adhesive, such as a pressure-sensitive optical adhesive, and the lens assembly may be laminated to a functional stack (not shown). The lens 200 may be a prescription lens configured to correct at least one visual defect of the user. For example, the curved surface 210 may have a curvature based on an ophthalmic prescription or analogous data provided by a user.

The substrate and/or any additional components within the lens assembly and the functional stack provide additional mechanical stability to the prescription lens and allow the prescription lens to be relatively thin compared, for example, to an eyeglass lens. For example, a plano-concave prescription lens may include a central portion having a lens thickness less than or approximately equal to 2 mm, such as less than or approximately equal to 1 mm, or in some examples less than or approximately equal to 0.5 mm. Lens 200 (e.g., a plano-convex lens) may have a peripheral portion (e.g., an edge thickness) having a lens thickness less than or approximately equal to 2 mm, such as less than or approximately equal to 1 mm, or in some examples less than or approximately equal to 0.5 mm.

FIGS. 3A-3F illustrate an example method of fabricating an AR/VR device.

Figures 3A, 3B, 3C:
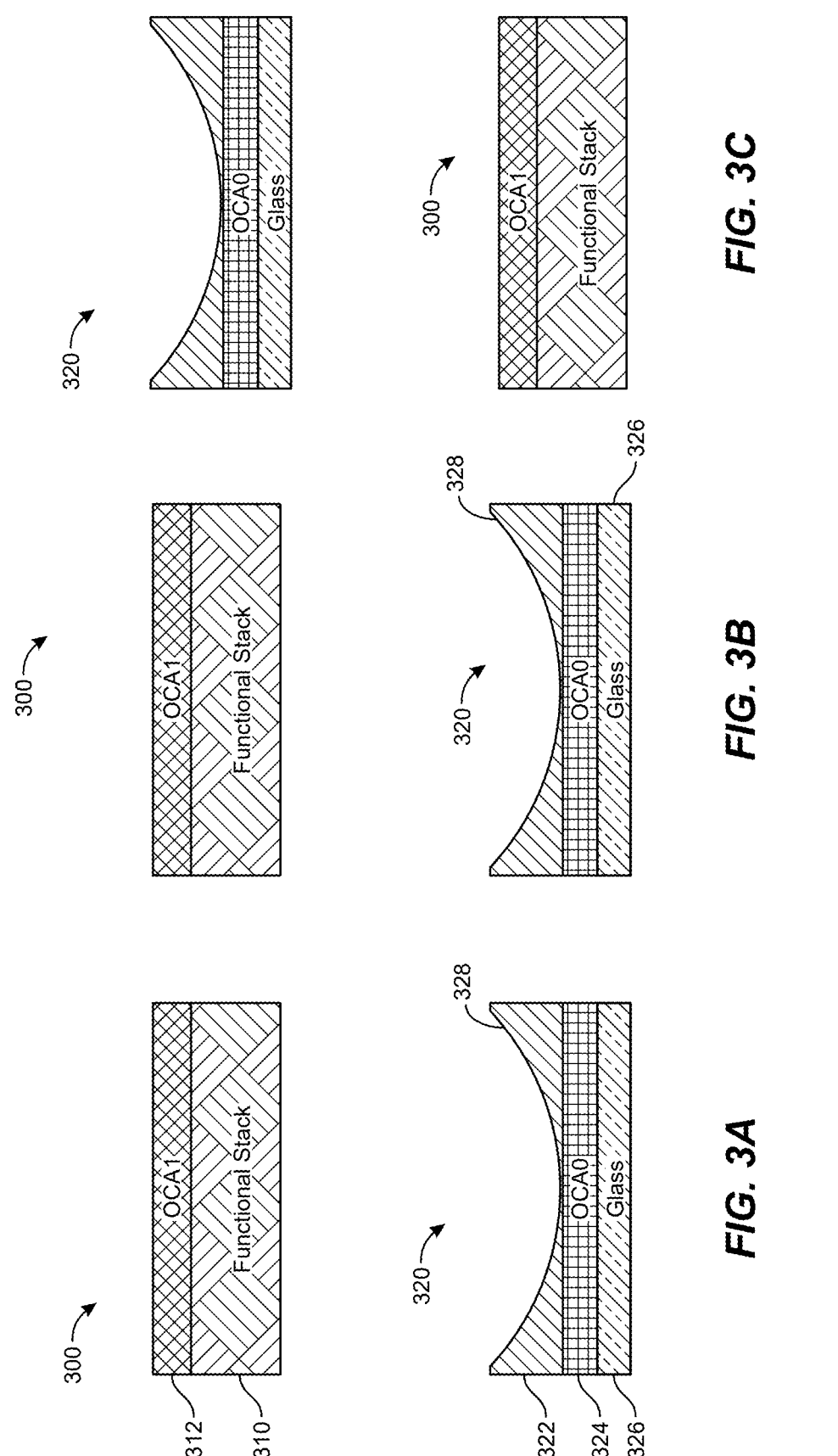
FIGS. 3A-3F illustrate an example method of fabricating an AR/VR device, according to some embodiments.

FIG. 3A represents moving the functional stack 300 and the lens assembly 320 into a lamination chamber. The functional stack 300 may include a stack adhesive layer 312 formed on a surface of functional stack elements 310. For example, the stack adhesive layer 312 may be formed on an upper (as illustrated) planar surface of the functional stack elements 310.

The lens assembly 320 may include a lens 322 having a curved surface 328 (e.g., a prescription lens having a curved prescription surface), a lens adhesive layer 324 and a substrate 326 (e.g., a glass substrate). The lens adhesive layer may bond the lens 322 to the substrate 326. As discussed elsewhere, one or more adhesive layers may be formed on the functional stack 300 and/or the lens assembly 320 that allow the lens assembly to be attached to the functional stack.

FIG. 3B represents fiducial recognition of the lens assembly 320 and/or the functional stack 300. In some examples, the lens assembly 320 and/or the functional stack 300 may include, support or otherwise be associated with one or more fiducial marks allowing alignment of the lens assembly 320 and the functional stack 300. For example, a fiducial mark may include a spot, cross, or other graphical element or other discernable mark.

FIG. 3C represents alignment of the lens assembly 320 and the functional stack 300, for example, in a vacuum or near-vacuum, in a reduced pressure (below atmospheric pressure) gas, in an atmospheric pressure gas, and/or in an inert atmosphere. For example, the lamination chamber may include air or an inert gas such as nitrogen or noble gas.

Figure 3F:
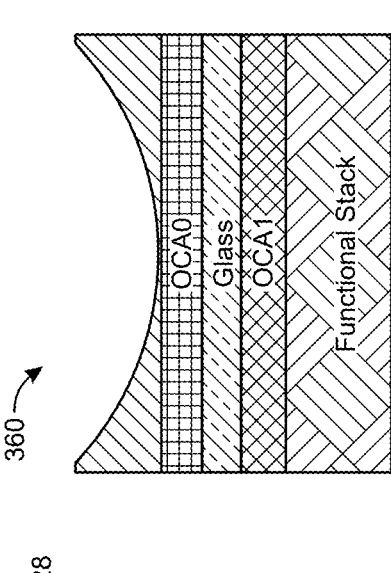
Figure 3E:
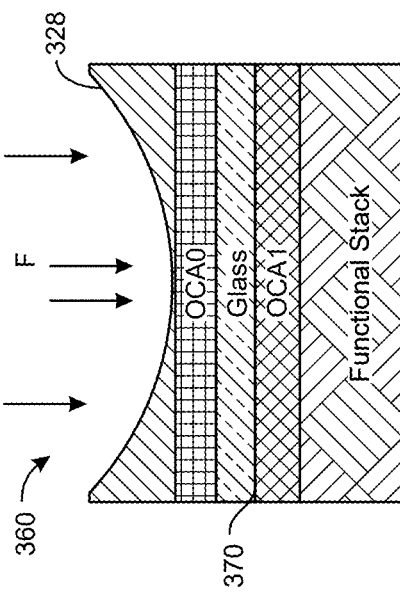
Figure 3D:
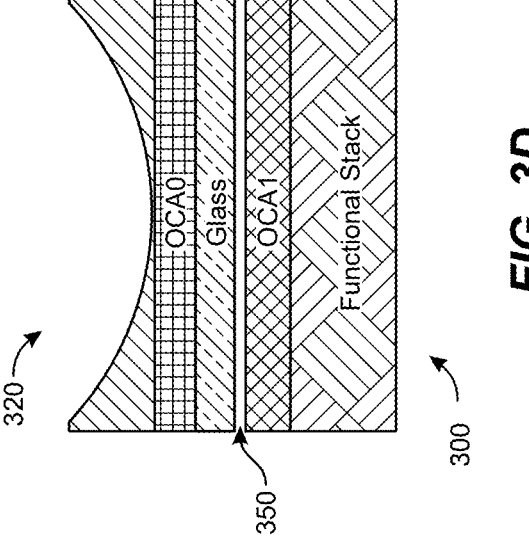

FIG. 3D represents "soft landing" the lens assembly 320 on the functional stack 300, or vice versa, or otherwise bringing the lens assembly 320 and functional stack 300 into a proximal arrangement. There may be an air gap located within the separation 350 between the lens assembly 320 and the functional stack 300 (e.g., a continuous or non-continuous air gap). The separation 350 may be reduced by urging the lens assembly towards the functional stack or vice versa.

FIG. 3E represents lamination of the lens assembly 320 to the functional stack 300 using a force applied to the curved surface 328 of the lens assembly 320. The force may result from a pressure, such as a fluid pressure, acting over the curved surface 328. The downward pointing arrows (e.g., an arrow labeled F) represent a force applied over the curved surface 328 of the lens assembly 320. The application of a generally uniform pressure over the curved surface 328 of the lens assembly 320 is discussed in more detail below. The application of the force may laminate the functional stack 300 to the lens assembly 320 to form a laminated assembly 360 that may be referred to as a laminated combination or an optical configuration. Lamination may include application of pressure over the curved surface of the lens assembly, as schematically represented by the downwards pointing arrows F.

FIG. 3F represents removal of the laminated assembly 360 from the lamination chamber. The laminated assembly 360, which may also be referred to as an optical configuration, may be used in the fabrication of an AR/VR device. The laminated assembly 360 may include the lens assembly 320 adhered to the functional stack 300 using bonding between the stack adhesive layer and the lens assembly along the interface 370.

In some examples, a device (e.g., an AR/VR device) may include a housing, a display, and an optical configuration. An example device may include two optical configurations, for example, one for each eye. The lenses used in the two optical configurations may provide the same prescription optical corrections, or may provide different optical configurations for each eye.

In some examples, a separate lamination chamber may not be needed and the lamination may be performed in a production line environment.

In some examples, a method of fabricating an AR/VR device may include moving a lens assembly and a functional stack to a lamination chamber, fiducial recognition on the lens assembly and/or the functional stack, aligning the functional stack and the lens assembly (e.g., in vacuum, reduced pressure, atmospheric pressure, and/or in an inert atmosphere), bringing the lens assembly and the functional stack in proximity to each other, laminating the lens assembly to the functional stack using pressure applied over a curved surface of the lens assembly, and removal of the sample from the lamination chamber. In some examples, a separate lamination chamber may not be needed and the lamination may be performed in a production line environment.

Moving the lens assembly and the functional stack to the lamination chamber, or similar preparatory step, may include removal of any protective films on the optical assembly and/or the planar surface of the lens assembly. In some examples, surfaces to be laminated and/or other surfaces may be cleaned (e.g., using ultrasonic air cleaning).

Sample alignment may use one or more actuators, such as stepper motors and/or piezoelectric actuators. Alignment of fiducial marks may be monitored by visual inspection or artificial vision approaches. Any offset between fiducial marks (or other measure of misalignment) may be reduced between inspections where possible.

In some examples, surfaces to be laminated may be plasma activated. Surface quality may be inspected, for example, using a visual inspection apparatus, which may use reflected light from the surface, interferometry, or absorption detection. Inspection may be performed by a human, image analysis system, or any other suitable approach.

Soft landing of the lens assembly on the functional stack may include dropping or placing over a short distance (e.g., an initial separation of less than 2 mm, such as less than 1 mm). In some examples, the location of the surface of the functional stack in the vertical (z) direction may be determined and the lens assembly lowered towards the surface location under actuator control, and the vertical relative speed may be reduced as the separation distance reduces.

After removal from the chamber or otherwise completing the lamination process, the device may be visually inspected, for example, for bubbles in the laminated portion, scratches, or other defects. In some examples, an example method (or step thereof) may be partially or fully automated. For example, methods may be performed under computer control as described in more detail below.

Various approaches may be used to apply a uniform pressure over the curved surface of the lens assembly, for example, within the process described above in relation to FIGS. 3A-3F. Example approaches may use, for example, a flexible membrane, an arrangement of pogo pins, a conformable cushion in combination with a source of variable pressure, and a soft fixture that may include an elastomer. Example approaches may allow forces to be applied over most, essentially all, or all of a curved surface, and may allow force application to non-symmetric surfaces, edges, and other irregularities or variations. These example approaches and others are described in more detail below.

In some examples, an apparatus may include a membrane. The apparatus, which may be referred to as a membrane apparatus, may be used to apply pressure to the curved surface of a lens assembly. For example, a flexible membrane (e.g., a polymer membrane such as a polymer elastomer membrane) may be used to apply uniform pressure to the curved surface of the lens assembly. In some examples, a flexible membrane may be inflated and pressed against the curved surface of the lens assembly. For example, a fluid having an adjustable pressure may be introduced into a fluid enclosure at least partially defined by the membrane. In some examples, a fluid enclosure may be provided by the membrane in combination with a substrate to which the membrane is attached. In some examples, the membrane may be provided by a portion of a balloon-like assembly that may function as a fluid enclosure. Fluid pressure may be adjusted to apply a desired pressure to the lens assembly through the membrane. The fluid enclosure may function as an actuator by providing a z-height displacement of at least a portion of the membrane. The term z-height may refer to a direction parallel to the optical axis of the lens assembly and/or the functional stack. The membrane may conform to the curved surface of the prescription lens for a wide range of prescription curvatures and may provide complete surface coverage. The height (z-height) of the membrane (or, e.g., a substrate such as a frame supporting the membrane) may be controlled, for example, to help urge the membrane against the curvature of the curved surface of the lens assembly (e.g., representing the curvature of the prescription lens).

The membrane material, membrane thickness, membrane diameter or analogous dimension (e.g., edge or diagonal), enclosure dimensions and/or curvature center may be adjusted to achieve a desired force application profile on the lens assembly. A polymer membrane may include an elastomer polymer, and may be an elastic membrane. Membrane thicknesses may be in the range 10 microns-1 mm, for example, between 100 microns and 500 microns. In some examples, the membrane may have a thickness approximately equal to or less than 0.5 mm, such as a thickness approximately equal to or less than 0.2 mm. In some examples, the membrane may include a silicone polymer, a polyurethane (e.g., a thermoplastic polyurethane), polyethylene, polyvinyl chloride, or any other suitable polymer or derivative, blend or composite thereof.

Figure 4:
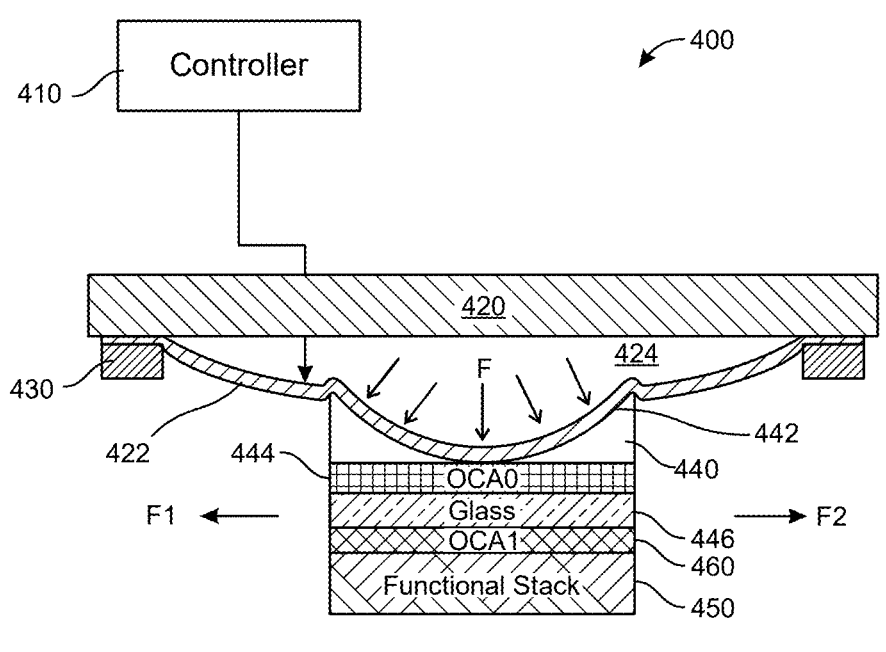
FIG. 4 shows an apparatus configured to apply pressure to a curved lens surface, according to some embodiments.

FIG. 4 shows an apparatus 400 configured to apply pressure to a curved surface 442 of a lens 440. The apparatus 400 includes a controller 410, a substrate 420, a membrane 422 and a membrane seal 430. The substrate position may be adjustable, for example, using an actuator (not shown). The membrane 422 may be a flexible membrane and may include a flexible polymer membrane, such as an elastic polymer membrane. The membrane seal 430 may include a ring configured to press the membrane 422 against the substrate 420 at the edge of the enclosure 424, though any suitable approach to sealing the enclosure 424 may be used, such as an adhesive layer or thermal bonding. The membrane 422 may be an elastic membrane. The substrate 420 and membrane 422 may at least partially define an enclosure 424. Gas of adjustable pressure may be introduced into the enclosure 424. For example, the controller 410 may include (or be in communication with) a pump configured to adjust the gas pressure within the enclosure 424.

FIG. 4 shows the apparatus 400 in cross section. In some examples, the substrate and/or membrane may have a circular shape. In some examples, the substrate and/or membrane may have a non-circular shape, such as any shape configured to match the shape of the lens assembly discussed further below. In some examples, controller 410 may include a pressure controller, such as a gas pressure controller. In some examples, controller 410 may provide an actuator signal to an actuator to control the force applied by the apparatus.

FIG. 4 further illustrates a lens assembly including a lens 440, a lens adhesive layer 444 and a substrate 446. The lens assembly may be located adjacent to a functional stack 450 supporting a stack adhesive layer 460. This may correspond to the arrangement shown in FIG. 3D discussed above. The apparatus 400 may be used to apply a force to the curved surface 442 (e.g., a spatially uniform force over the curved surface 442) of the lens 440. Increasing the gas pressure within the enclosure 424 may increase the force (represented by arrows labeled F) applied through the membrane 422 on the curved surface 442. These forces may laminate the lens assembly to the functional stack, for example, in an approach similar to that discussed above in relation to FIG. 3E.

For example, a portion of the membrane 422 may be in contact with the curved surface 442 of the lens 440. The arrows labeled "F" represent forces (e.g., due to an internal gas pressure within the enclosure) applied by the membrane to the lens assembly by the membrane. Lamination may include application of pressure over the curved surface of the lens assembly, as schematically represented by the generally downwards pointing arrows labeled "F".

The lens 440 may be located on the substrate 446 using the lens adhesive layer 444 (e.g., an optically clear adhesive layer labeled OCA0). Adhesive layers may be at least approximately index matched to one or both adjacent materials. The lens assembly, including the prescription lens and the glass substrate, may be laminated to the functional stack using the stack adhesive layer 460 (e.g., a second optically clear adhesive layer labeled OCA1). Adhesive layers (e.g., OCA0 and OCA1) may include the same or different optically clear adhesives.

In some examples, an adhesive layer may include a pressure-sensitive adhesive, for example, the adhesive layer used in the lamination process may be a pressure-sensitive adhesive, such as a pressure-sensitive optically clear adhesive. In some examples, a first layer may be applied to the lower surface of the lens assembly (e.g., the lower surface of the substrate 446 or the lower surface of the lens 440 if the substrate is omitted) and a second layer may be supported by the upper face of the functional stack 450. The two layers may react with each other to form an adhesive layer when brought in contact. In some examples, the first and second layers may be the same or different layers, such as the same or different adhesive layers.

The horizontal arrows F1 and F2 represent components of applied force parallel to the surfaces to be bonded. These may be insignificant, for example, if the curvature of the prescription lenses is low, or if the prescription lens and/or glass substrate is not distorted by these lateral forces. For example, the thickness of the stack adhesive layer may be reduced if the lateral forces induce lateral motion of the adhesive. In some examples, the stack adhesive layer may include spacers such as rods, films or beads.

In the illustrated example, the lens 440 is shown as a plano-concave lens. The lens 440 may be a prescription lens and the curved surface 442 may have a curvature based on an ophthalmic prescription, for example, for a particular user. However, pressure application approaches described herein may be used with plano-concave lenses, plano-plano lenses (e.g., having internal refractive index gradients providing desired prescription parameters), plano-convex lenses, biconcave lenses, biconvex lenes, lenses having both convex and concave surfaces, prescription Fresnel lenses (e.g., having curved facets approximating the curved surface of a corresponding concave or convex refractive lens), prism lenses, astigmatism-correction lenses, freeform lenses, or any other lenses suitable for vision correction.

Figure 5:
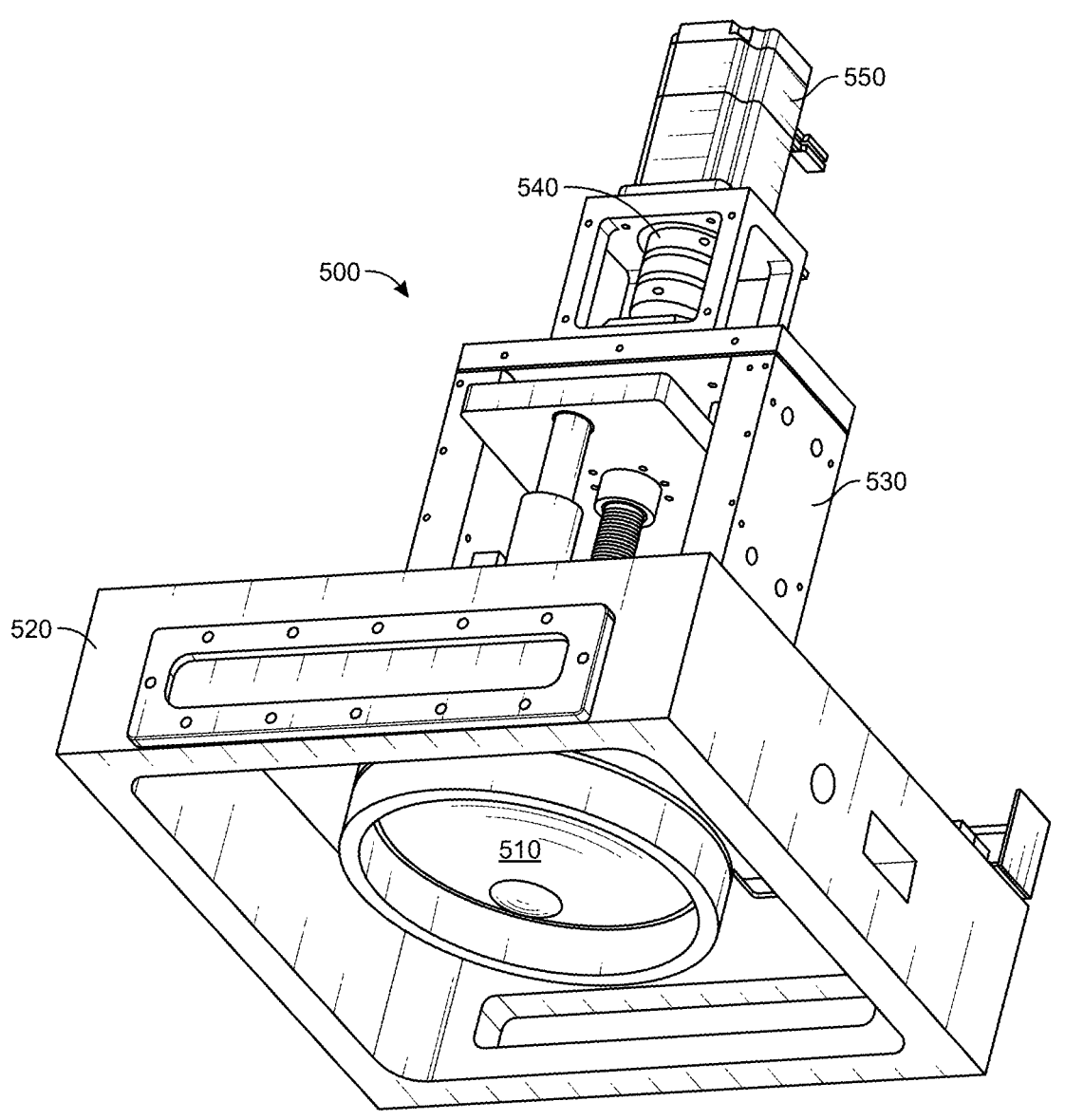
FIG. 5 shows a portion of an apparatus that may be used to apply pressure against a curved optical surface, according to some embodiments.

FIG. 5 shows a portion of an apparatus 500 that may be used to apply pressure against a surface of a sample, such as the curved surface of a lens. Any suitable apparatus configuration may be used. The apparatus 500 includes a membrane 510, a membrane support 520, a drive support 530, a drive unit 540, and an actuator 550.

The membrane 510 may be configured to provide an adjustable profile that may be modified by varying a fluid pressure within an enclosure at least partially defined by the membrane. The fluid may include a gas and/or liquid. As illustrated, the membrane may distend downwards and away from the apparatus, may provide a planar surface, or may distend so as to provide a concave surface (e.g., to match the surface profile of a convex lens). One or more actuators, such as actuator 550, may be used to control the location of the membrane relative to the sample. In some examples, an actuator may include a servo motor, a stepper motor, a piezoelectric actuator, an adjustable pressure source, or any other positional control device along with any suitable associated components.

The actuator 550 may be configured to position the membrane 510 against the curved surface of the sample (not shown but may be the curved surface of a lens assembly). In some examples, the actuator may further urge the membrane against the curved surface to apply a greater force to the sample. In some examples, the membrane may be positioned proximate or adjacent to the sample and then increased fluid pressure (e.g., within an enclosure) may be used to apply a greater force on the sample. In some examples, one or more sensors (not shown) may be used to determine gas pressure and/or a force applied against a sample. The sample may include a lens assembly and the force may be used to laminate the lens assembly to a functional stack.

Figure 6:
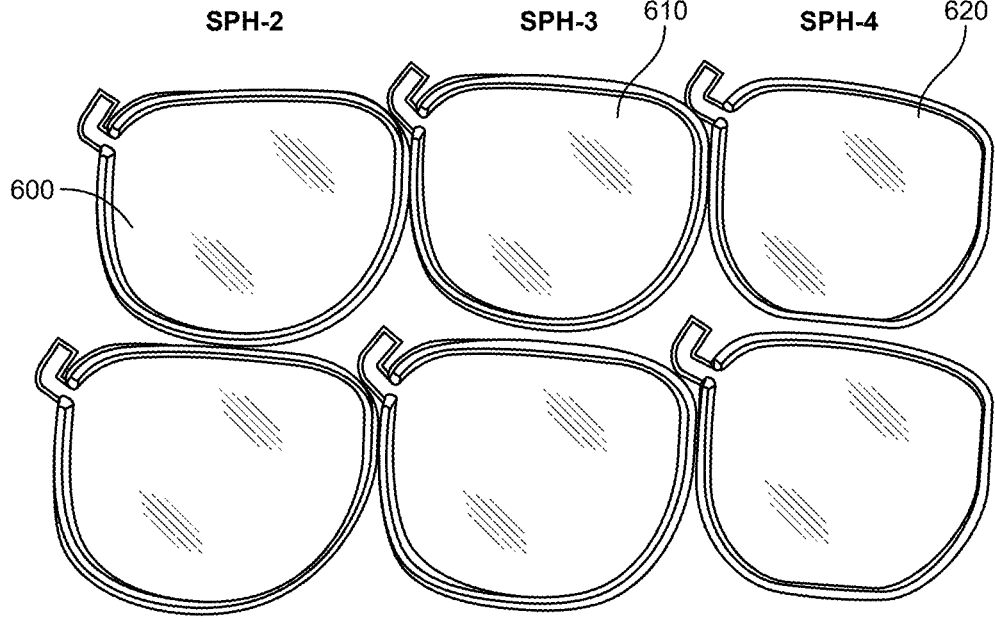
FIG. 6 shows bubble-free lamination achieved for a variety of prescription lenses using a membrane-based approach to apply pressure to the lens assembly, according to some embodiments.

FIG. 6 illustrates that bubble-free lamination was achieved for a variety of prescription lenses using a membrane-based approach (such as described above) to apply pressure to the lens assembly. Lenses (such as lenses 600, 610 and 620) were fabricated by laminating a lens assembly to a functional stack using a membrane to apply pressure to a curved surface of the lens assembly. Bubble free lamination was obtained for a various prescription lenses having different optical powers. For example, SPH may refer to a sphere correction and the associated number may refer to an optical power in diopters, so that SPH-2 may refer to a sphere correction of 2 diopters. No bubbles were visually discernable at the laminated interface between respective lens assemblies and optical stacks for the various optical powers.

In some examples, an apparatus may include pogo pins. The apparatus, which may be referred to as a pogo pin apparatus, may be used to apply pressure to the curved surface of a lens assembly.

In some examples, a pogo pin apparatus may include an arrangement of pogo pins (e.g., an array of pogo pins) that may be configured to apply uniform pressure to the curved surface of a lens assembly. An example pogo pin apparatus may include spring-controlled pogo pins and/or pneumatically controlled pogo pins. The z-height of each pin may be individually controlled to provide complete surface coverage. Pins may include at least one metal (e.g., as an alloy), a polymer, or other material. Pin length, pin diameter, pin pitch or tip material may be adjusted according to, for example, the range of curvatures expected, the prescription lens material used, or other factors. For example, the pin length may be between 1 mm and 10 mm, the pin diameter may be between 0.1 mm and 2 mm, the tip material may include a polymer (e.g., a fluoropolymer, an elastomer, a fluoropolymer elastomer, polyethylene (e.g., low density polyethylene), or a combination, derivative, or blend thereof.)

Figure 7A:
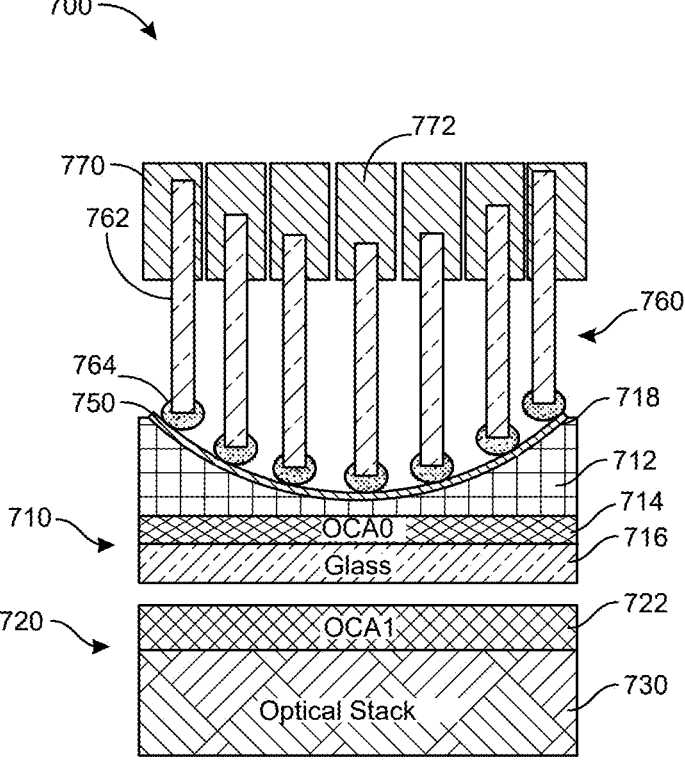
FIGS. 7A-7C illustrate an example portion of an example apparatus including pogo pins, according to some embodiments.

FIG. 7A shows an example apparatus 700 including a plurality of pogo pins 760 configured to apply forces to the curved surface 718 of a lens assembly 710. An example pogo pin of the plurality of pogo pins 760 may include a pin section 762 and a resilient portion 764 (in this example, a tip portion). An arrangement of actuators (e.g., actuators 770 and 772) may be configured to urge the pin sections 762 of the pogo pins towards the lens assembly 710 to urge the lens assembly 710 towards the functional stack 720 to achieve lamination. Forces on the lens assembly may be applied through the resilient portion 764 to reduce damage on the curved surface 718. In some examples, the curved surface 718 may support a protection layer 750. Further aspects of the lamination process, the lens assembly 710, the functional stack 720, and the protection layer 750 are discussed further below.

The lens assembly 710 may include a lens 712 (e.g., a prescription lens), a lens adhesive layer 714 and a substrate 716. The functional stack 720 may include a stack adhesive layer 722 and an optical stack 730. The optical stack may include one or more optical components, such as a lens, polarizer, beamsplitter, and the like. The functional stack 720 may have a planar upper surface (sometime termed a stack surface) that supports the stack adhesive layer 722, and the functional stack 720 may be located proximate a corresponding planar surface of the lens assembly which in this example may be an exterior surface of substrate 716. The proximate surfaces of the lens assembly and the functional stack may be laminated together using an adhesive layer (e.g., the stack adhesive layer 722) located between the two surfaces and pressure applied using pogo pins to the curved surface 718 of the lens assembly using the apparatus 700. For example, the plurality of pogo pins 760 may be used to apply a downwards force (as illustrated) to the curved surface 718 of the lens assembly 710, and the downwards force may be distributed over the curved surface using the pogo pins.

In some examples, the curved surface of the lens assembly may support a protection layer 750, such as a thin polymer film. In some examples, the protection layer may have a thickness approximately equal to or less than 0.5 mm, such as a thickness approximately equal to or less than 0.2 mm. In some examples, the protection layer may include a polyurethane, polyethylene, polyvinyl chloride, or other polymer. In some examples, a membrane may be deposited on the curved surface before application of forces using the pogo pins. The membrane may be removed later, for example, after the lamination process is complete.

Figure 7B:
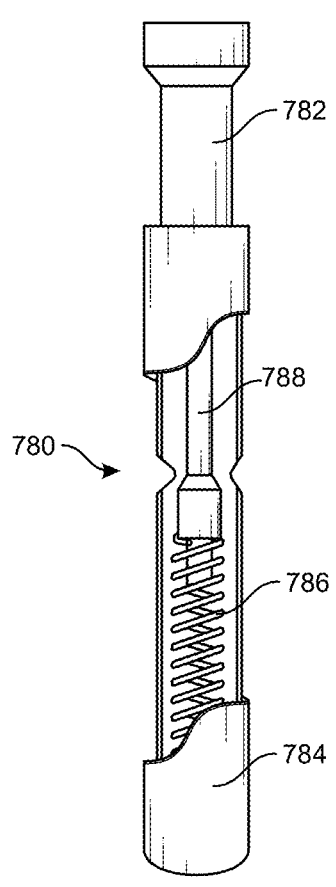

FIG. 7B shows an example pogo pin 780 in more detail, in this example, a spring-loaded pin. Example pogo pins may include a portion (e.g., a tip) including a resilient material or a spring. Example pogo pin 780 may include a first pin portion 782 and a second pin portion 784 (e.g., both first and second pin portions may be metal pin portions) and a spring 786 configured to urge the first pin portion 782 and second pin portion 784 apart when the second pin portion is pushed towards the first pin portion. In some examples, one portion of the pogo pin may be attached to the pogo pin apparatus (e.g., as shown in FIG. 7A) so that the spring 786 urges the other end portion of the pogo pin downwards onto the curved surface of the lens assembly. In some examples, a portion 788 of the first pin portion may extend into and be received by the second pin portion 784 (or vice versa), and the spring 786 may be at least partially enclosed by the walls of the first and/or second pin portion.

In some examples, a soft element (e.g., a resilient portion) may be located at the distal end of each pin. The soft element may apply a force to the curved surface of a lens assembly, by direct contact or through a protection layer as discussed above. In some examples, the end of the pin closest to the prescription lens may support a rubber end portion (e.g., a natural or synthetic rubber or elastomer).

In some examples, a vacuum suction cup may be located at the end of one or more pogo pins, for example, the end proximate the lens assembly during operation of the apparatus. An example apparatus may include a plurality of vacuum suction cups, which may have a larger contact surface area with the lens assembly compared to pins alone. An apparatus may include at least one vacuum channel, for example, extending between the apparatus and an adjustable pressure source such as a low pressure source (e.g., a vacuum source). In this context, vacuum may refer to pressures less than ambient pressure.

Figure 7C:
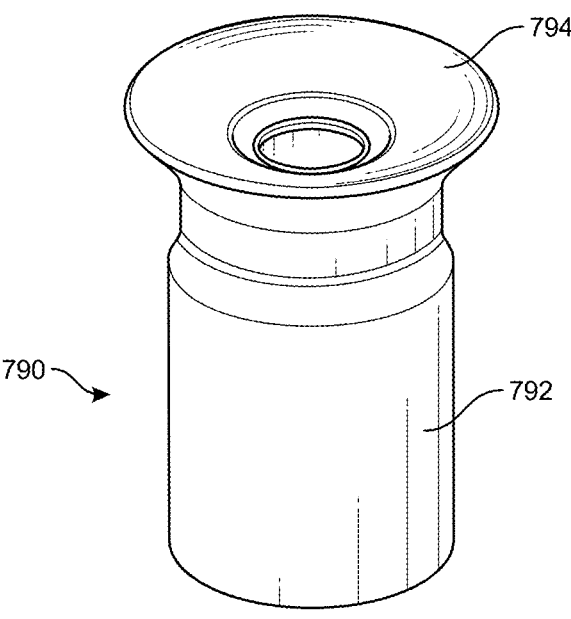

FIG. 7C shows an example suction cup 790 that may be used in some examples. The suction cup 790 may include a body portion 792 configured to attach to a pin (or pin portion), and a cup end 794 configured to contact a curved lens surface or protection layer disposed thereon. Lamination under vacuum may require an appreciable pressure difference between the suction cup and the chamber pressure. The suction cup material may be selected to reduce surface contamination of the curved surface of the prescription lens. For example, the suction cup may include a fluoropolymer, or may be coated with a release agent. In some examples, the curved surface of a lens assembly may be coated with a protective film, for example, during or after manufacture. The protective film may remain on the curved surface during application of pressure using pogo pins, a membrane, or any deformable element, or during any other approach used to apply pressure to the curved surface, after which the protective film may be removed.

In some examples, a soft material may be used for contact (e.g., as an elastomer element or suction cup). Soft materials may be replaced at intervals to reduce damage to the lens surface due to soft material degradation. Example soft materials may include an elastomer (e.g., a natural or synthetic rubber), a foam material, a material including a flexible material (e.g., folded sheets), and the like. In some examples, a resilient element (e.g., a spring, polymer elastomer or the like) may be located between pin portions, or between a pin (or portion thereof) and an actuator.

Excellent conformity to the lens surface was observed using pogo pins. In some examples, lamination may be performed under vacuum, using pogo pins or any other approach to apply pressure to the lens assembly.

A pogo pin apparatus may include a plurality of pogo pins. For each pogo pin, the pin stroke (e.g., height range of the distal end of the pogo pin) and/or pin force may be configured to provide contact over the curved surface of the lens assembly. An apparatus may include a replaceable pogo pin assembly configured for an expected range of prescriptions. For example, pins in the central area of a first pogo pin assembly configured to apply pressure to a concave curved surface may be longer than comparable pins in a second assembly configured to apply pressure to a convex curved surface. For example, pins in an edge region of a first assembly configured to apply pressure to a convex curved surfaces may be longer than comparable pins in a second assembly configured to apply pressure to a convex curved surface. One of a plurality of pogo pin assemblies may be selected by the apparatus (or an operator) based on parameter ranges of prescription data.

Figure 8A:
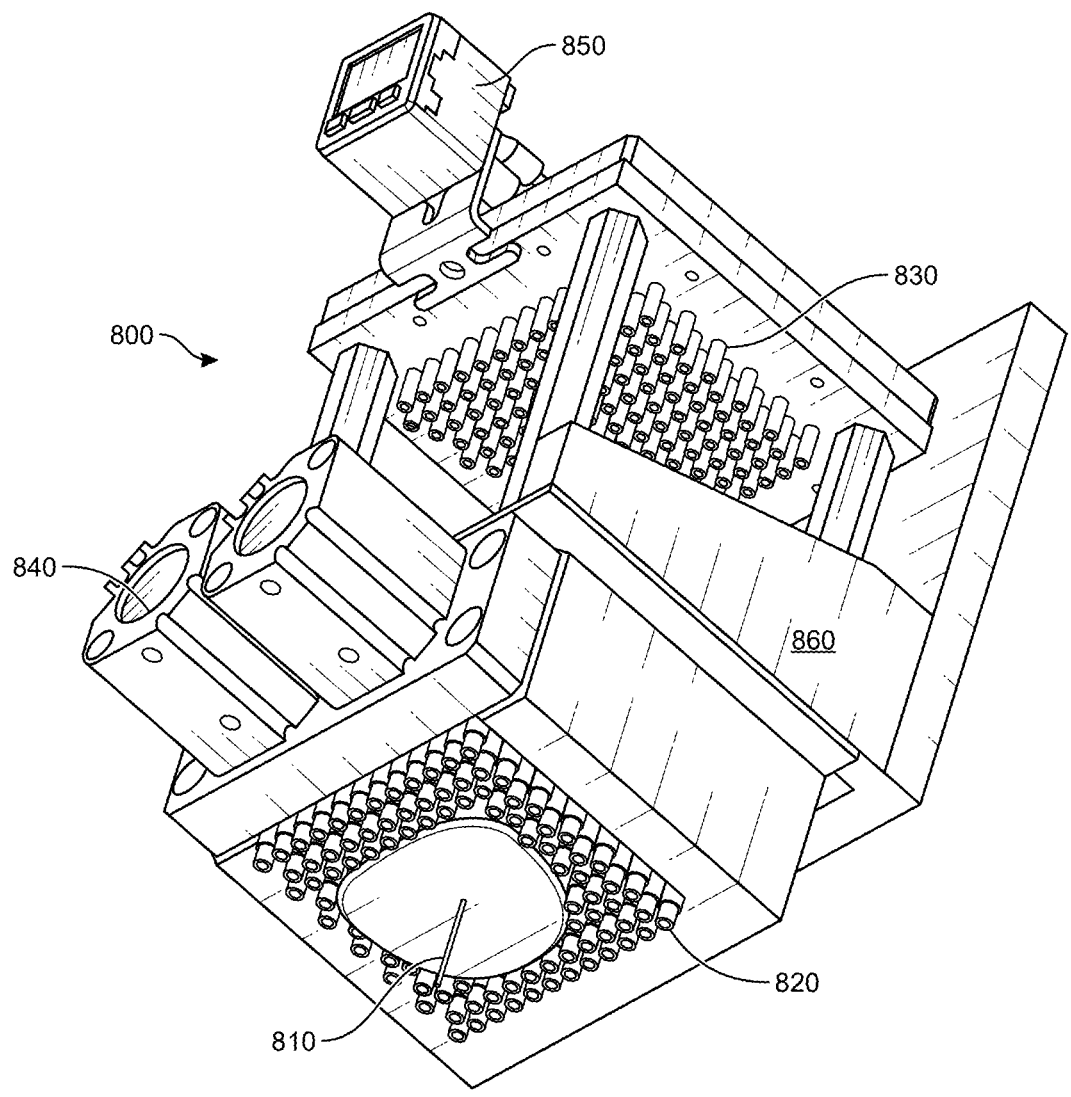
FIGS. 8A and 8B illustrate a prescription lens in contact with an arrangement of vacuum cups and further show a pneumatic cylinder, according to some embodiments.
Figure 8B:
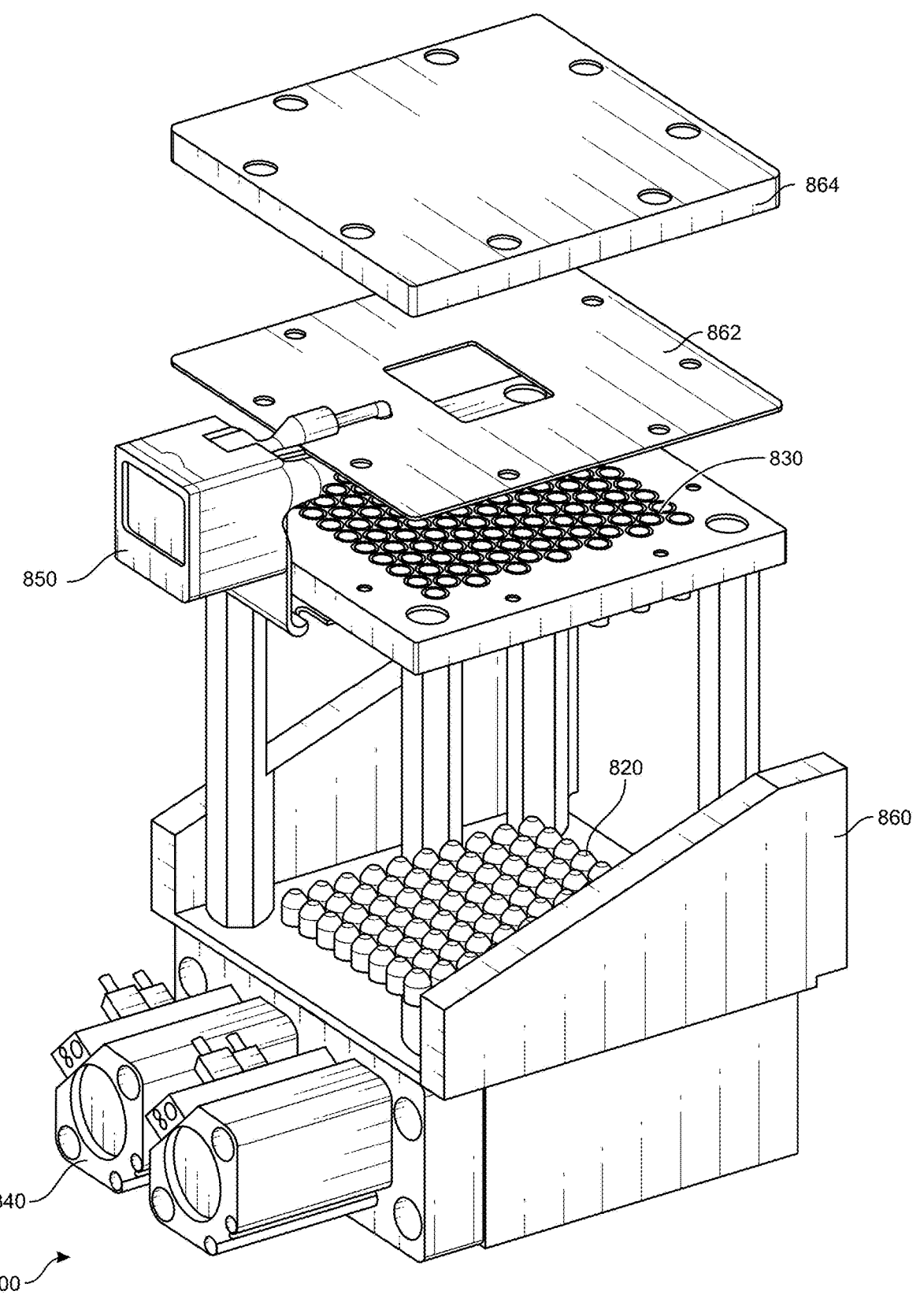

FIGS. 8A and 8B show views of an example apparatus including an arrangement of pogo pins. In some examples, an arrangement of vacuum cups may make contact with the curved surface of the lens assembly. In some examples, the vacuum cups may be used to hold the lens assembly as it is aligned with the functional stack.

FIG. 8A shows an apparatus 800 including a first arrangement 820 of pogo pins configured to contact a surface of a lens 810 (e.g., a prescription lens). Other associated lens assembly elements and the functional stack are not shown for clarity. In some examples, pogo pins of the first arrangement 820 may include vacuum cups such as those illustrated above in relation to FIG. 7C. Positioning elements may be used to position the first arrangement 820 relative to a lens. In some examples, positioning elements 840 may include one or more actuators. In some examples, positioning elements 840 may include one or more pneumatic controls, such as pneumatic cylinders. The apparatus 800 may include a second arrangement 830 of pins or other elements and housing components such as housing component 860. The second arrangement 830 may be used to contact a second lens assembly (not shown), may be urged against the first arrangement 820 to apply a force to the lens 810, or may be used to convey a source of reduced pressure to the first arrangement 820.

The apparatus 800 may also include a controller 850. The controller 850 may be configured to control one or more of the position(s) of apparatus components, low pressure supply to pogo pins, applied force applied to the lens 810, or other aspect of apparatus operation and/or configuration. The controller 850 may receive manual inputs through one or more user interface elements such as buttons, keys, or the like, or may be in wired or wireless communication with a computer device programmed to provide control inputs to the apparatus 800.

FIG. 8B further illustrates an apparatus similar to apparatus 800. Element numbers represent similar elements to those described above in relation to FIG. 8A, and further include housing components 862 and 864. In some examples, apparatus 800 may include at least one pneumatic cylinder.

Figure 9:
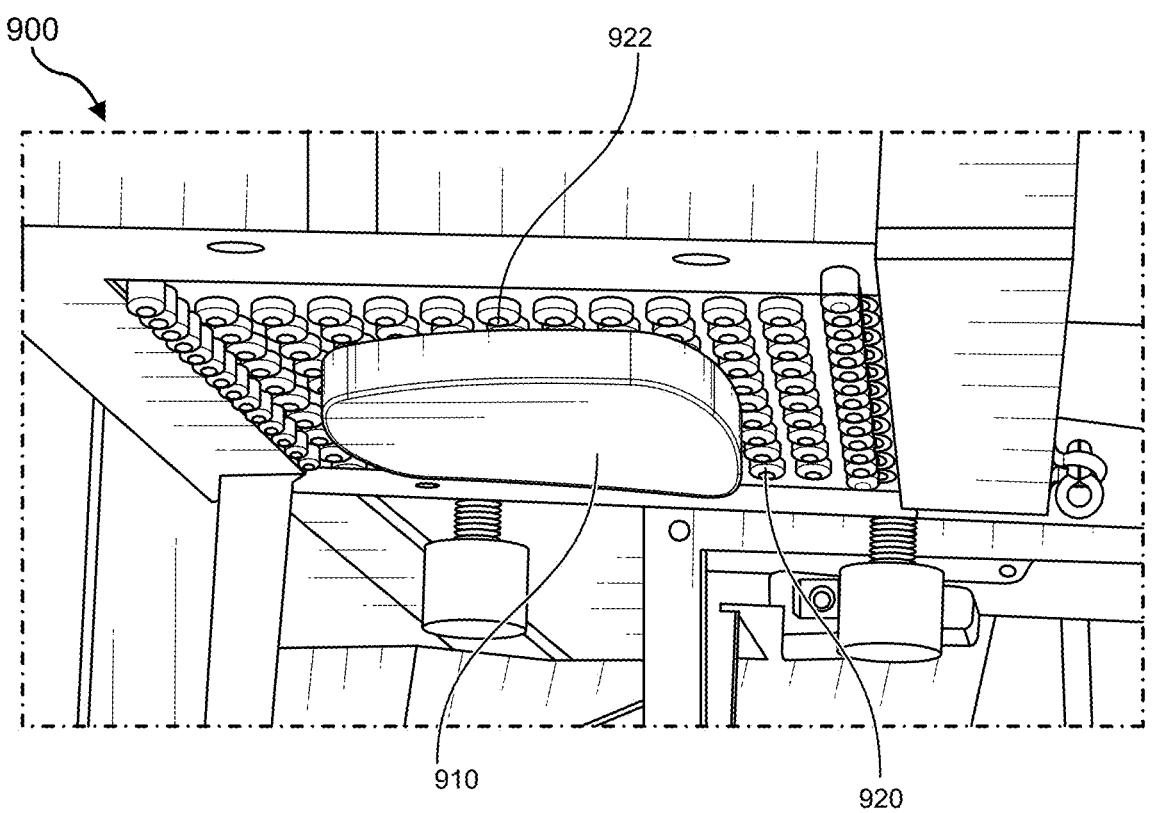
FIG. 9 shows an apparatus configured apply pogo pins to the curved surface of a prescription lens, according to some embodiments.

FIG. 9 shows a portion of an apparatus 900 including elements 920 in contact with a prescription lens 930. The apparatus 900 may be similar to the apparatus 800 described above. The elements 920 may be pogo pins having an end portion 922 that includes a suction cup and/or vacuum connection. In some examples, elements 920 may include a plurality of suction cups in fluid communication with a source of below-ambient pressure. In some examples, the apparatus 900 may be a portion of the apparatus 800 discussed above.

Figure 10:
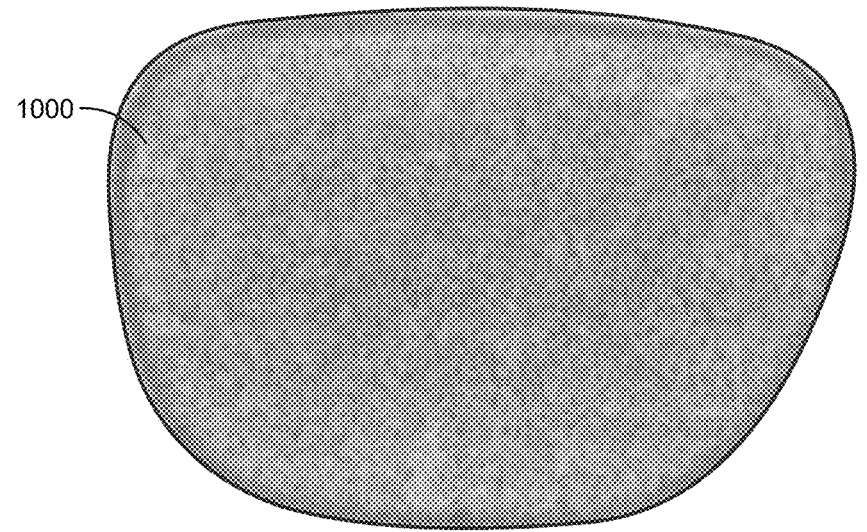
FIG. 10 shows pressure-sensitive paper that indicates an excellent pressure uniformity achieved using an apparatus similar to that shown in FIGS. 8A and 8B, according to some embodiments.

FIG. 10 shows pressure-sensitive paper 1000 used to indicate the excellent pressure uniformity over a lens surface achieved using an apparatus similar to that shown in FIGS. 8A and 8B. A uniform pressure of 4 kg/cm$^2$ was applied over the surface of the lens.

In some examples, an apparatus may include a conformable cushion in combination with an adjustable pressure source. The apparatus, which may be referred to as a conformable cushion apparatus, may be used to apply pressure to the curved surface of a lens assembly. An example conformable cushion apparatus may provide excellent coverage of non-symmetric surfaces and edges. An example apparatus may be used to apply pressure over a curved surface having spherical and/or cylindrical curvature. The cushion deformation may be based on the vacuum level and cushion properties. At least one of the vacuum level (gas pressure), cushion material, cushion shape, and/or cushion size may be adjustable based on at least one parameter such as surface curvature, desired edge contact, and/or force intended to be applied to the lens assembly.

Figure 11:
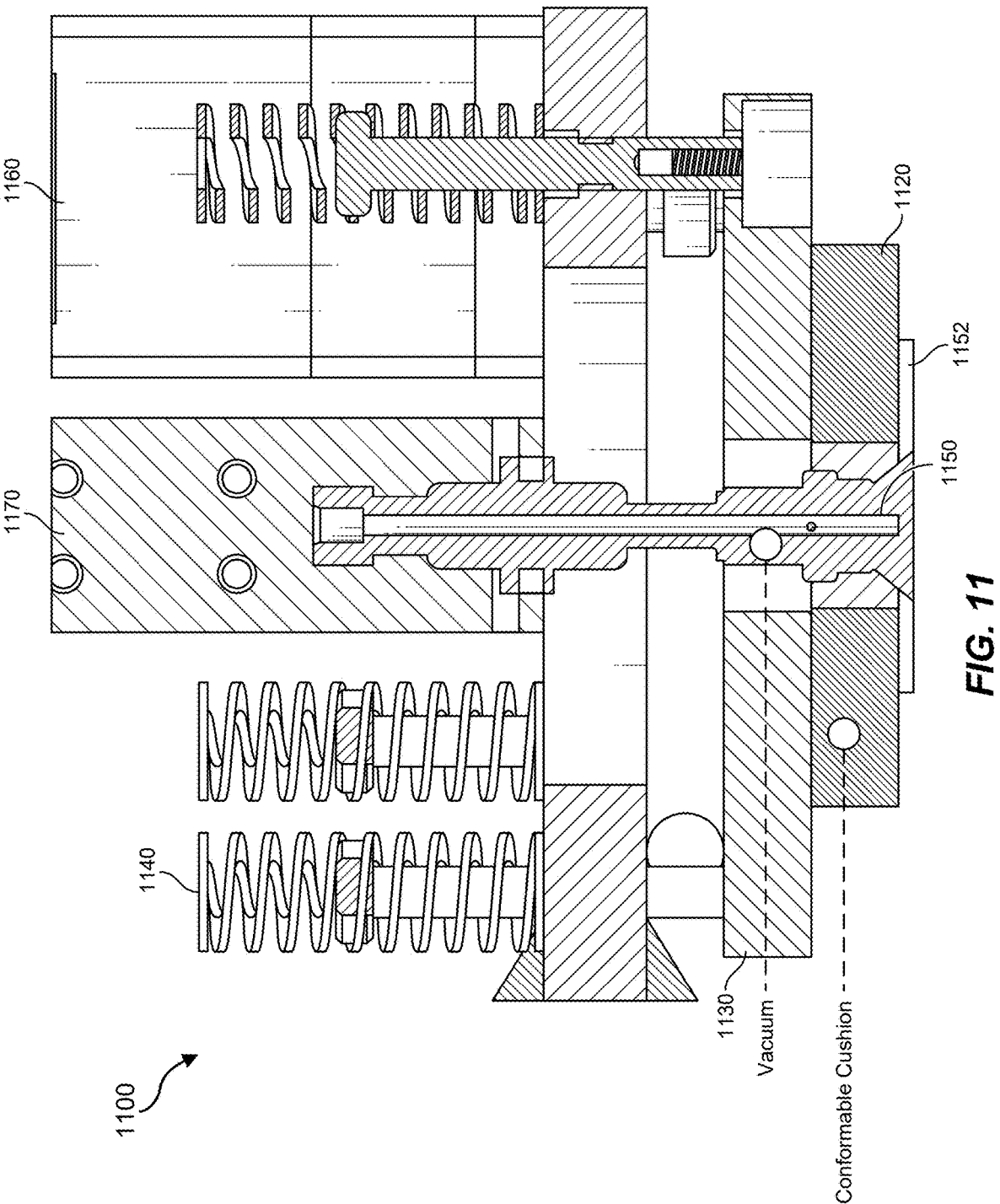
FIG. 11 shows an apparatus including a conformable cushion and an adjustable pressure source, according to some embodiments.

FIG. 11 shows an apparatus 1100 including a conformable cushion 1120 and an adjustable pressure source 1130. The apparatus may include a vacuum connection (e.g., a connection to a vacuum pump or other source of pressure less than ambient pressure) to the conformable cushion 1120. The apparatus may further include springs 1140 that may provide a force urging the conformable cushion against, for example, a curved surface of a lens assembly (not shown). In some examples, an elongate element 1150 (e.g., a pin such as a pogo pin) may extend through the apparatus and may optionally connect to the conformable cushion through an end portion 1152. The end portion 1152 may be flexible and conformable (e.g., to the curved surface of a lens assembly). The elongate element 1150 may be controlled by optional actuator 1170.

In some examples, the shape of the conformable cushion may be controlled by adjusting a gas pressure. If the gas pressure is increased within one or more enclosures within the conformable cushion 1120, the end portion 1152 may be urged against the lens assembly. In some examples, urging the elongate element 1150 towards the lens assembly may induce a conformation change in the conformable cushion 1120 that improves the uniformity of the force applied to the lens assembly (e.g., by spreading the force over the end portion 1152). The conformable cushion may change shape in response to being urged against the lens assembly to improve the uniformity of the applied force to the lens assembly. In some examples, only elongate element may be used, but in other examples, a plurality of elongate elements may be used.

The conformable cushion shape may be similar to that of the prescription lens, and in some examples the surface area of the cushion available to make contact with the prescription lens may be between 80% and 200% of the surface area of the prescription lens. In some examples, a conformable cushion may include an elastomer and/or a foam. In some examples, foam rigidity and/or void fraction may be adjusted based on the force required.

In some examples, an apparatus may include a soft fixture. The apparatus, which may be referred to as a soft fixture apparatus, may be used to apply pressure to the curved surface of a lens assembly.

In some examples, a soft fixture may be pressed against the curved surface. A soft fixture may at least partially conform to the curved surface or other part geometry. A soft fixture may include a unitary body (e.g., a single element that may include an elastomer). In some examples, a soft fixture may include a plurality of separate elements. An example soft fixture may include a rubber, such as a natural or synthetic rubber. In some examples, a soft fixture may provide excellent coverage for non-symmetric surfaces and edges.

In some examples, a force sensor may determine the force applied to the lens assembly and the pressure applied may be adjusted based on the pressure sensor signal received by a controller. A similar approach may be used in other examples. For example, an apparatus may include a deformable element and a force mechanism configured to urge the deformable element against a curved surface. The apparatus may further include a force sensor where, in this context, a force sensor may include a pressure sensor. The force mechanism (e.g., an actuator or variable fluid pressure source) may be controlled based on the force sensor signal. For example, a controller may receive the force sensor signal and control an actuator (or other mechanical force mechanism) or pressure control to adjust the force applied to the curved surface. In some examples, an apparatus may include a loop-back pressure sensor control to control the pressure applied by one or more soft fixtures. An apparatus may include a plurality of force sensors (e.g., associated with each of a plurality of deformable elements) allowing the force applied by each of the plurality of deformable elements to be adjusted, for example, to obtain a more uniform force over the curved surface. An example soft fixture may include a rubber, such as a natural or synthetic rubber. An example soft fixture may include an elastomer. An example apparatus may include between 1 and 64 soft fixture elements, though this is not limiting. In some examples, a soft fixture may be used to apply a pressure gradient to the curved surface of a lens assembly, for example, due to non-parallel surfaces of the curved surface and the soft fixture. In some examples, a soft fixture may have a curved surface at least approximately complementary to the curved surface of the lens assembly. For example, a soft fixture having a convex surface may be used to apply a force to a concave curved lens surface or portion thereof. In some examples, an apparatus may include at least one actuator, such as a servo motor, that may be used to control the force applied to the lens assembly by one or more soft fixtures.

Figure 12:
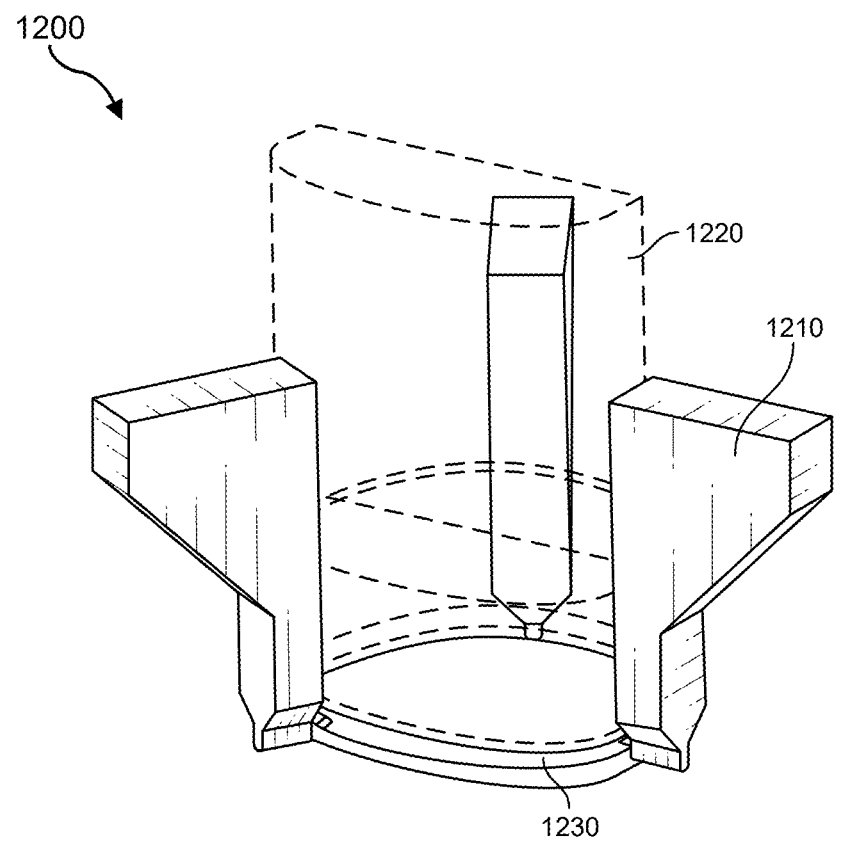
FIG. 12 shows an example apparatus for lens handling, according to some embodiments.

FIG. 12 shows a portion of an example lens handling apparatus 1200. In some examples, a lens assembly 1230 (e.g., including a prescription lens) may be held by the edges. A soft fixture 1220 may be guided (e.g., by a guide assembly 1210) towards the curved surface of the lens assembly, for example, under actuator control. The applied pressure, for a particular soft fixture, may be estimated based on further displacement (e.g., compression) after first contact, and/or a pressure sensor (e.g., located between the soft fixture and the actuator) may be used to provide a pressure sensor signal.

Figure 13:
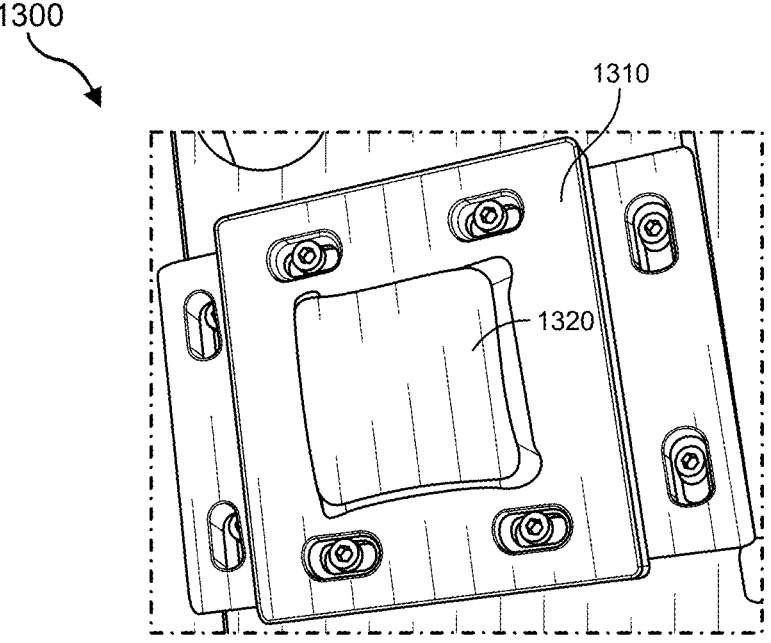
FIG. 13 shows an example soft fixture including a unitary soft fixture element, according to some embodiments.

FIG. 13 shows a portion of an apparatus 1300 including a soft fixture 1320 (e.g., unitary soft fixture element) within a holder 1310. The soft fixture 1320 may be urged against the surface of a lens using actuator control of the holder 1310. The actuator is not shown in the figure but may be located with a mechanical connection to the holder 1310.

Figure 14A:
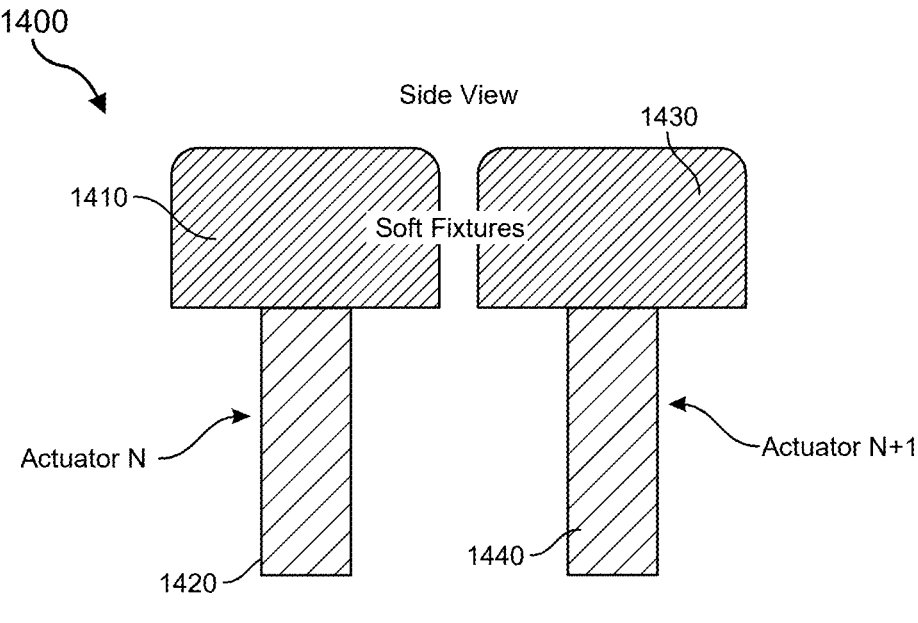
FIGS. 14A and 14B show a multi-body soft fixture according to some embodiments, where
Figure 14B:
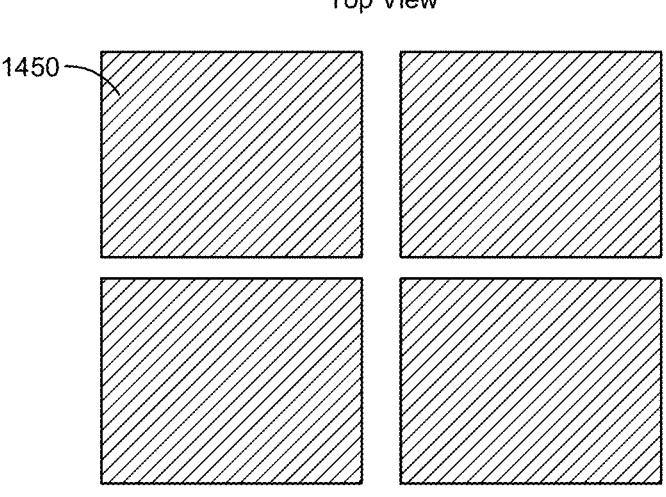

FIGS. 14A and 14B illustrate a portion of an apparatus 1400 (e.g., a multi-body soft fixture apparatus), where FIG. 14A shows a side view and FIG. 14B shows a top view. The apparatus 1400 may include an arrangement of a plurality of soft fixtures arranged in an N×M configuration, where N and M may be integers. N and M may be the same or different.

FIG. 14A shows a side view of soft fixtures 1410 and 1430 associated with actuators 1420 and 1440 respectively. In some examples, the actuators may include servo motors, stepper motors, or pneumatic controllers. Other arrangements may be used. For example, for an elongated lens, a 3×2 arrangement may be used, or a greater number of soft fixtures used.

FIG. 14B shows an end view (e.g., a top view) of 4 soft fixtures arranged in a 2×2 configuration of soft fixtures, such as soft fixture 1450.

In some examples, a soft fixture element may include a rubber, such as an elastomer. Example elastomers include natural elastomers and/or synthetic elastomers. In some examples, an apparatus may include a fiber-polymer composite, such as a fiberglass-reinforced polyester, for example, a thermoset fiberglass-reinforced polyester.

In some examples, a combination of a lens assembly and functional stack as described herein may be used as an optical module, for example, in an AR/VR device. An optical module may also be described as an optical configuration and may include a laminated combination of the lens assembly and functional stack. In some examples, an optical module of a wearable device may be configured to receive light from a display and direct the light to an eye of a user when the user wears the wearable device.

Example wearable devices include an AR/VR device or other head-mounted device such as a night-vision device. Example wearable devices may be used to view augmented reality. An example wearable device may be in communication with a computer (or may include a controller) configured to provide augmented reality images and modify the augmented reality images based on user inputs that may be provided by user inputs, such as received by touch sensors, gesture detectors, and the like that may also be in communication with the computer.

Example methods include computer-implemented methods for operating or fabricating an apparatus, such as an apparatus as described herein. The steps of an example method, such as adhering components together, may be performed by any suitable computer-executable code and/or computing system, including an apparatus such as an optical fabrication apparatus, and may be used to fabricate a augmented reality and/or virtual reality system using approaches as described herein. In some examples, one or more of the steps of an example method may represent an algorithm whose structure includes and/or may be represented by multiple sub-steps. In some examples, a method for assembling an optical device such as an AR/VR device may include computer control of an apparatus, for example, an apparatus configured to align and laminate together optical components.

In some examples, an apparatus may include at least one physical processor and physical memory including computer-executable instructions that, when executed by the physical processor, cause the physical processor to control an apparatus for assembling an optical device, for example, using a method such as described herein.

In some examples, a non-transitory computer-readable medium may include one or more computer-executable instructions that, when executed by at least one processor of an apparatus, cause the apparatus to at least partially assemble an optical device, for example, using a method such as described herein.

In some examples, a method includes applying a force to a curved surface of a lens assembly using at least one element, such as an elongated element including at least one of a resilient material or a spring. A method may further include adhering the lens assembly to a functional stack using the force to urge the lens assembly against the functional stack, and fabricating an augmented reality or virtual reality device using the combination of the lens assembly and the functional stack. In some examples, the lens assembly may include a prescription lens, and the curved surface may include a lens surface of the prescription lens, for example, a concave surface or a convex surface. Applying the force to the curved surface may include at least partially conforming the deformable element to the curved surface. Adhering the lens assembly to the functional stack may include using the force to urge an assembly surface of the lens assembly against a stack surface of the functional stack. In some examples, the assembly surface and the stack surface may each be planar surfaces. The deformable element may include a membrane. The membrane may at least partially define a fluid enclosure, and applying the force to the curved surface may include adjusting an internal fluid pressure (e.g., a gas pressure or a liquid pressure) of the fluid enclosure.

In some examples, the deformable element may include a plurality of pogo pins. Applying the force to the curved surface may include urging the plurality of pogo pins against the curved surface, for example, including mechanical urging or pneumatic urging. In some examples, the deformable element may include at least conformable cushion and/or at least one soft fixture. An example deformable element may be urged against the curved surface using a vacuum, reduced pressure, an actuator, or increased pressure (e.g., within an enclosure mechanically coupled to the deformable element).

In some examples, adhering the lens assembly to the functional stack includes using the force to urge the lens assembly against the functional stack, where an adhesive layer may be located between the lens assembly and the functional stack. The adhesive layer may include an optical adhesive, for example, a pressure-sensitive optical adhesive. In this context, an optical adhesive may have a refractive index having a difference of approximately 0.1 or less from that of at least one adjacent layer (e.g., for at least one wavelength of visible light at 20 degrees C.).

In some examples, a method may include receiving a lens prescription from a user, fabricating a prescription lens based on the lens prescription, laminating a lens assembly including the prescription lens to a functional stack using a deformable element to urge the lens assembly against the functional stack to form a laminated combination of the lens assembly and the functional stack, and fabricating an augmented reality or virtual reality device using the laminated combination. The prescription lens may have a lens portion (e.g., a central lens portion for a concave lens) having a lens thickness less than 1 mm. Example concave lenses may include a plano-concave lens, a biconcave lens, or a lens having concave and convex surfaces where the center of the lens is thinner than the thickness of a peripheral portion.

In some examples, a method may include receiving a lens prescription from a user, fabricating a prescription lens based on the lens prescription where the prescription lens has a lens portion having a lens thickness less than 1 mm, and adhering the prescription lens to a glass substrate using an adhesive to form a lens assembly. The method may further include adhering the lens assembly to a functional stack using a deformable element to urge the lens assembly against the functional stack, and fabricating an augmented reality or virtual reality device using the combination of the lens assembly and the functional stack. Adhering the lens assembly to the functional stack may include applying an adhesive layer (e.g., including an optical adhesive and/or a pressure-sensitive adhesive) to at least one of the lens assembly and the functional stack. In some examples, a substrate may include a planar glass substrate. In some examples, a substrate may include at least one curved surface, such as a curved exterior surface that may be complementary to the exterior surface of a functional stack.

Examples also include augmented reality devices and/or virtual reality devices, for example, AR/VR devices fabricated using one or more of the methods described herein.

In some examples, an apparatus may include a sample holder configured to support a lens assembly and a functional stack in positional registration, a deformable element, and an actuator configured to apply a force to the curved surface of the lens assembly using the deformable element to thereby adhere the planar surface of the lens assembly to the functional stack. The lens assembly may have a curved surface and a planar surface that may be termed an assembly surface. The functional stack may have a planar surface that may be adhered to the assembly surface. In some examples, the lens assembly and functional stack may have complementary surfaces that may be bonded together, for example, a concave surface and a convex surface respectively, or vice versa, where, for example, the convex and concave surfaces may have similar magnitudes of radius of curvature. The deformable element may include at least one of a membrane, a plurality of pogo pins, a conformable cushion, or at least one soft fixture. An apparatus may further include a controller configured to provide actuator control signals to the actuator to control at least one of a separation distance between the lens assembly and the functional stack, or a force applied to the curved surface of a lens assembly. An apparatus may further include a force sensor configured to provide a force signal correlated with a force applied to the curved surface, and the controller may receive the force signal and adjust an actuator signal provided to an actuator based on the force signal, for example, to maintain a suitable force on the lens assembly. An actuator may include a servo motor, a stepper motor, a piezoelectric actuator, or an adjustable pressure source along with any suitable associated components.

In some examples, a device may include a lens assembly, a functional stack, and a display, where the functional stack includes an optical configuration configured to direct light from the display through the lens assembly when the display is energized, and the lens assembly includes a prescription lens, and the prescription lens has a lens portion having a lens thickness of approximately equal to or less than 1 mm, such as approximately equal to or less than 500 microns, for example, of approximately equal to or less than 250 microns. The prescription lens may have an optical power magnitude of at least 0.25 diopters. The device may include a head-mounted device, for example, an augmented reality device and/or a virtual reality device. In some examples, an apparatus may include at least one physical processor, and physical memory including computer-executable instructions that, when executed by the physical processor, cause the physical processor to control the apparatus to perform at least one method, such as a method described herein. The apparatus may further include a non-transitory computer-readable medium including one or more computer-executable instructions that, when executed by at least one processor of a computing device, cause the apparatus to perform a method as described herein. A method may include a computer-implemented method.

In some examples, a device may include an eyepiece including an exterior surface of the functional stack. A user that does not require vision correction may purchase and use the device. If a user requires vision correction, a lens assembly may be laminated on to the functional stack using methods and apparatus described herein to provide a suitably vision-corrected apparatus. Laminating the lens assembly to the functional stack may be performed in a commercial fabrication facility or at a retail or consumer service location, such as at a retailer of AR/VR devices, or at an optician. An optician may provide a user with lens assemblies based on the user's ophthalmic prescription, which may be determined by the optician. In some examples, an ophthalmic prescription may be modified based on the known optical properties of the AR/VR device to provide a desired optical performance of the device.

In some examples, a method may include receiving a lens prescription from a user (e.g., an eyeglass prescription, such as an ophthalmic prescription). In some examples, a prescription may represent reading glasses or any other vision correction. For example, a user may enter lens prescription data into a website or otherwise provide lens prescription data. A prescription lens may be fabricated based on the lens prescription. The prescription lens may be appreciably thinner than a similar optical power prescription lens used in an eyeglass, and the prescription lens may have a lens portion having a lens thickness less than 2 mm, in some examples, less than 1 mm, and in some examples, less than 0.5 mm. The prescription lens may be adhered to a glass substrate using an optical adhesive. A lens assembly may include a prescription lens and optionally one or more other components such as a substrate (e.g., a glass, plastic, or other substrate) adhered to the planar surface of the prescription lens. The lens assembly may be laminated to a functional stack to form an optical module, for example, for an AR/VR device. The optical module may be configured to provide an augmented reality image at the eye of the user when the user wears the device and the device is operated. In some examples, the lens assembly may have a planar surface that may be laminated to a planar surface of the functional stack. In some examples, a curved surface of an example lens assembly may be adhered to a conforming curved surface of an example functional stack.

In some examples, an AR/VR device may include at least one prescription lens adapted to a particular user. Apparatus and methods are described for applying a generally constant pressure over the curved surface of a prescription lens to form an assembly including the lens (optionally supported by a glass substrate) and a functional stack that may include optical components, such as at least one of a waveguide, polarizer, optical retarder or any other suitable components. The prescription lens may be fabricated based on customer prescription data and may be appreciably thinner than lenses used in standard eyeglasses. In particular, the central portion of a plano-concave lens may be significantly thinner than that of a conventional eyeglass lens. Prescription lenses may also include plano-convex lenses. The prescription lens may have a planar surface that may be adhered to a planar glass substrate. An optical assembly, optionally including a glass substrate, may then be laminated to the functional stack using pressure applied to the curved surface of the prescription lens. A pressure-sensitive adhesive may be used. Approaches to applying a uniform pressure to the curved prescription lens surface may include a flexible membrane, an arrangement of pogo pins (e.g., spring-mounted pins), a conformable cushion combined with adjustable pressure, or a soft fixture (e.g., including an elastomer). Excellent results were obtained, for example, using the flexible membrane approach. Example approaches may also be used to adhere an optical assembly (e.g., including a plano-concave or plano-convex lens) having a curved surface to one or more other optical elements, for example, by applying generally uniform pressure over the curved surface or at a plurality of locations distributed over the curved surface.

EXAMPLE EMBODIMENTS

Example 1: An example method may include locating a lens assembly proximate a functional stack where the lens assembly has a curved surface, applying a force to the curved surface of the lens assembly using a deformable element, adhering the lens assembly to a functional stack using the force to urge the lens assembly against the functional stack to form a laminated combination, and fabricating an augmented reality or virtual reality device using the laminated combination, where the functional stack includes at least one additional lens, at least one polarizer, and at least one beamsplitter.

Example 2. The method of claim 1, further including receiving a lens prescription for a user, and fabricating the lens assembly, where the curved surface of the lens assembly has a curvature based on the lens prescription.

Example 3. The method of examples 1 or 2, where the curved surface is a concave surface or a convex surface.

Example 4. The method of any of examples 1-3, where applying the force to the curved surface includes at least partially conforming the deformable element to the curved surface.

Example 5. The method of any of examples 1-4, where adhering the lens assembly to the functional stack includes using the force to urge a lens assembly surface of the lens assembly against a functional stack surface of the functional stack.

Example 6. The method of example 5, where the lens assembly surface and the functional stack surface are each planar surfaces.

Example 7. The method of any of examples 1-6, where the deformable element includes a membrane.

Example 8. The method of example 7, where the membrane at least partially defines a fluid enclosure, and applying the force to the curved surface includes adjusting an internal fluid pressure of the fluid enclosure.

Example 9. The method of any of examples 1-8, where the deformable element includes a pogo pin.

Example 10. The method of example 9, where applying the force to the curved surface includes urging a plurality of pogo pins against the curved surface, the plurality of pogo pins includes the pogo pin and the pogo pin includes a resilient material.

Example 11. The method of example 10, where urging the plurality of pogo pins includes mechanical urging or pneumatic urging.

Example 12. The method of any of examples 1-11, where the deformable element includes a conformable cushion.

Example 13. The method of any of examples 1-12, where the conformable cushion is urged against the curved surface using a vacuum or reduced pressure relative to an atmospheric pressure.

Example 14. The method of any of examples 1-13, where the deformable element includes at least one soft fixture and the at least one soft fixture includes an elastomer.

Example 15. The method of any of examples 1, where adhering the lens assembly to a functional stack includes using the force to urge the lens assembly against the functional stack so that the lens assembly is adhered to the functional stack using an adhesive layer located between the lens assembly and the functional stack.

Example 16. The method of example 15, where the adhesive layer includes a pressure-sensitive optical adhesive.

Example 17. An apparatus fabricated using the method of any of examples 1 16, where the apparatus is the augmented reality device, the apparatus further includes a display, the laminated combination is configured to direct light from the display to an eye of a user, and the lens has a lens portion having a lens thickness that is approximately equal to or less than 1 mm.

Example 18. An example apparatus may include a sample holder configured to support a lens assembly and a functional stack in positional registration, where the lens assembly has a curved surface and a planar surface, a deformable element, and an actuator configured to apply a force to the curved surface of the lens assembly using the deformable element to thereby adhere the planar surface of the lens assembly to a surface of the functional stack.

Example 19. The apparatus of example 18, where the deformable element includes a membrane, a plurality of pogo pins, a conformable cushion, or at least one soft fixture.

Example 20. The apparatus of examples 18 or 19 where the apparatus includes an augmented reality device, and the functional stack includes at least one lens, at least one beamsplitter, and at least one polarizer.

Embodiments of the present disclosure may include or be implemented in conjunction with various types of artificial reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial reality systems may be designed to work without near-eye displays (NEDs). Other artificial reality systems may include an NED that also provides visibility into the real world (such as, e.g., augmented-reality system 1500 in FIG. 15) or that visually immerses a user in an artificial reality (such as, e.g., virtual-reality system 1600 in FIG. 16). While some artificial-reality devices may be self-contained systems, other artificial-reality devices may communicate and/ or coordinate with external devices to provide an artificial-reality experience to a user. Examples of such external devices include handheld controllers, mobile devices, desktop computers, devices worn by a user, devices worn by one or more other users, and/or any other suitable external system.

Figure 15:
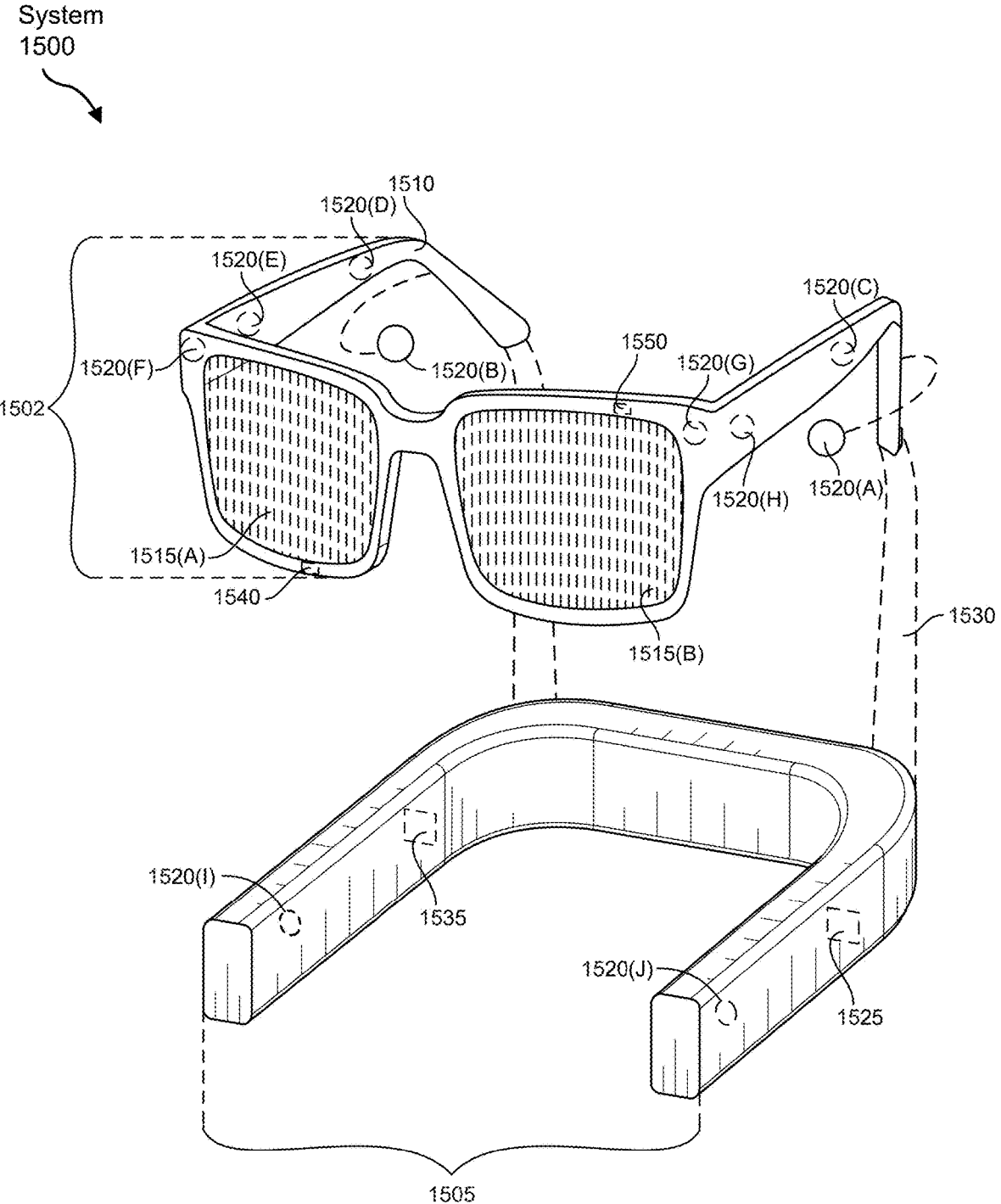
FIG. 15 is an illustration of exemplary augmented-reality glasses that may be used in connection with embodiments of this disclosure.
Figure 16:
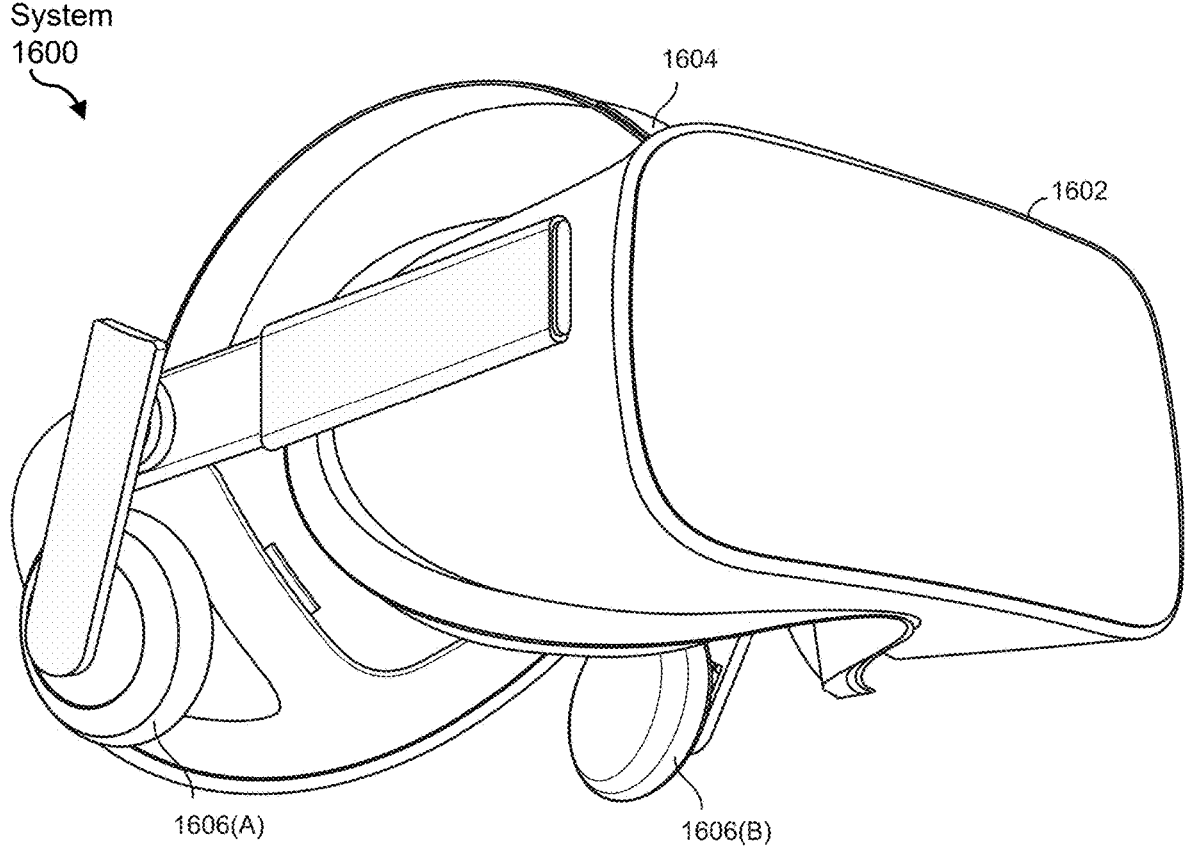
FIG. 16 is an illustration of an exemplary virtual-reality headset that may be used in connection with embodiments of this disclosure.

Turning to FIG. 15, augmented-reality system 1500 may include an eyewear device 1502 with a frame 1510 configured to hold a left display device 1515(A) and a right display device 1515(B) in front of a user's eyes. Display devices 1515(A) and 1515(B) may act together or independently to present an image or series of images to a user. While augmented-reality system 1500 includes two displays, embodiments of this disclosure may be implemented in augmented-reality systems with a single NED or more than two NEDs.

In some embodiments, augmented-reality system 1500 may include one or more sensors, such as sensor 1540. Sensor 1540 may generate measurement signals in response to motion of augmented-reality system 1500 and may be located on substantially any portion of frame 1510. Sensor 1540 may represent one or more of a variety of different sensing mechanisms, such as a position sensor, an inertial measurement unit (IMU), a depth camera assembly, a structured light emitter and/or detector, or any combination thereof. In some embodiments, augmented-reality system 1500 may or may not include sensor 1540 or may include more than one sensor. In embodiments in which sensor 1540 includes an IMU, the IMU may generate calibration data based on measurement signals from sensor 1540. Examples of sensor 1540 may include, without limitation, accelerometers, gyroscopes, magnetometers, other suitable types of sensors that detect motion, sensors used for error correction of the IMU, or some combination thereof.

In some examples, augmented-reality system 1500 may also include a microphone array with a plurality of acoustic transducers 1520(A)-1520(J), referred to collectively as acoustic transducers 1520. Acoustic transducers 1520 may represent transducers that detect air pressure variations induced by sound waves. Each acoustic transducer 1520 may be configured to detect sound and convert the detected sound into an electronic format (e.g., an analog or digital format). The microphone array in FIG. 15 may include, for example, ten acoustic transducers: 1520(A) and 1520(B), which may be designed to be placed inside a corresponding ear of the user, acoustic transducers 1520(C), 1520(D), 1520(E), 1520(F), 1520(G), and 1520(H), which may be positioned at various locations on frame 1510, and/or acoustic transducers 1520(I) and 1520(J), which may be positioned on a corresponding neckband 1505.

In some embodiments, one or more of acoustic transducers 1520(A)-(J) may be used as output transducers (e.g., speakers). For example, acoustic transducers 1520(A) and/or 1520(B) may be earbuds or any other suitable type of headphone or speaker.

The configuration of acoustic transducers 1520 of the microphone array may vary. While augmented-reality system 1500 is shown in FIG. 15 as having ten acoustic transducers 1520, the number of acoustic transducers 1520 may be greater or less than ten. In some embodiments, using higher numbers of acoustic transducers 1520 may increase the amount of audio information collected and/or the sensitivity and accuracy of the audio information. In contrast, using a lower number of acoustic transducers 1520 may decrease the computing power required by an associated controller 1550 to process the collected audio information. In addition, the position of each acoustic transducer 1520 of the microphone array may vary. For example, the position of an acoustic transducer 1520 may include a defined position on the user, a defined coordinate on frame 1510, an orientation associated with each acoustic transducer 1520, or some combination thereof.

Acoustic transducers 1520(A) and 1520(B) may be positioned on different parts of the user's ear, such as behind the pinna, behind the tragus, and/or within the auricle or fossa. Or, there may be additional acoustic transducers 1520 on or surrounding the ear in addition to acoustic transducers 1520 inside the ear canal. Having an acoustic transducer 1520 positioned next to an ear canal of a user may enable the microphone array to collect information on how sounds arrive at the ear canal. By positioning at least two of acoustic transducers 1520 on either side of a user's head (e.g., as binaural microphones), augmented-reality system 1500 may simulate binaural hearing and capture a 3D stereo sound field around about a user's head. In some embodiments, acoustic transducers 1520(A) and 1520(B) may be connected to augmented-reality system 1500 via a wired connection 1530, and in other embodiments acoustic transducers 1520(A) and 1520(B) may be connected to augmented-reality system 1500 via a wireless connection (e.g., a BLUETOOTH connection). In still other embodiments, acoustic transducers 1520(A) and 1520(B) may not be used at all in conjunction with augmented-reality system 1500.

Acoustic transducers 1520 on frame 1510 may be positioned in a variety of different ways, including along the length of the temples, across the bridge, above or below display devices 1515(A) and 1515(B), or some combination thereof. Acoustic transducers 1520 may also be oriented such that the microphone array is able to detect sounds in a wide range of directions surrounding the user wearing the augmented-reality system 1500. In some embodiments, an optimization process may be performed during manufacturing of augmented-reality system 1500 to determine relative positioning of each acoustic transducer 1520 in the microphone array.

In some examples, augmented-reality system 1500 may include or be connected to an external device (e.g., a paired device), such as neckband 1505. Neckband 1505 generally represents any type or form of paired device. Thus, the following discussion of neckband 1505 may also apply to various other paired devices, such as charging cases, smart watches, smart phones, wrist bands, other wearable devices, hand-held controllers, tablet computers, laptop computers, other external compute devices, etc.

As shown, neckband 1505 may be coupled to eyewear device 1502 via one or more connectors. The connectors may be wired or wireless and may include electrical and/or non-electrical (e.g., structural) components. In some cases, eyewear device 1502 and neckband 1505 may operate independently without any wired or wireless connection between them. While FIG. 15 illustrates the components of eyewear device 1502 and neckband 1505 in example locations on eyewear device 1502 and neckband 1505, the components may be located elsewhere and/or distributed differently on eyewear device 1502 and/or neckband 1505. In some embodiments, the components of eyewear device 1502 and neckband 1505 may be located on one or more additional peripheral devices paired with eyewear device 1502, neckband 1505, or some combination thereof.

Pairing external devices, such as neckband 1505, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 1500 may be provided by a paired device or shared between a paired device and an eyewear device, thus reducing the weight, heat profile, and form factor of the eyewear device overall while still retaining desired functionality. For example, neckband 1505 may allow components that would otherwise be included on an eyewear device to be included in neckband 1505 since users may tolerate a heavier weight load on their shoulders than they would tolerate on their heads. Neckband 1505 may also have a larger surface area over which to diffuse and disperse heat to the ambient environment. Thus, neckband 1505 may allow for greater battery and computation capacity than might otherwise have been possible on a stand-alone eyewear device. Since weight carried in neckband 1505 may be less invasive to a user than weight carried in eyewear device 1502, a user may tolerate wearing a lighter eyewear device and carrying or wearing the paired device for greater lengths of time than a user would tolerate wearing a heavy stand-alone eyewear device, thereby enabling users to more fully incorporate artificial reality environments into their day-to-day activities.

Neckband 1505 may be communicatively coupled with eyewear device 1502 and/or to other devices. These other devices may provide certain functions (e.g., tracking, localizing, depth mapping, processing, storage, etc.) to augmented-reality system 1500. In the embodiment of FIG. 15, neckband 1505 may include two acoustic transducers (e.g., 1520 (*I*) and 1520(J)) that are part of the microphone array (or potentially form their own microphone subarray). Neckband 1505 may also include a controller 1525 and a power source 1535.

Acoustic transducers 1520(I) and 1520(J) of neckband 1505 may be configured to detect sound and convert the detected sound into an electronic format (analog or digital). In the embodiment of FIG. 15, acoustic transducers 1520 (*I*) and 1520(J) may be positioned on neckband 1505, thereby increasing the distance between the neckband acoustic transducers 1520(I) and 1520(J) and other acoustic transducers 1520 positioned on eyewear device 1502. In some cases, increasing the distance between acoustic transducers 1520 of the microphone array may improve the accuracy of beamforming performed via the microphone array. For example, if a sound is detected by acoustic transducers 1520(C) and 1520(D) and the distance between acoustic transducers 1520(C) and 1520(D) is greater than, for example, the distance between acoustic transducers 1520(D) and 1520(E), the determined source location of the detected sound may be more accurate than if the sound had been detected by acoustic transducers 1520(D) and 1520(E).

Controller 1525 of neckband 1505 may process information generated by the sensors on neckband 1505 and/or augmented-reality system 1500. For example, controller 1525 may process information from the microphone array that describes sounds detected by the microphone array. For each detected sound, controller 1525 may perform a direction-of-arrival (DOA) estimation to estimate a direction from which the detected sound arrived at the microphone array. As the microphone array detects sounds, controller 1525 may populate an audio data set with the information. In embodiments in which augmented-reality system 1500 includes an inertial measurement unit, controller 1525 may compute all inertial and spatial calculations from the IMU located on eyewear device 1502. A connector may convey information between augmented-reality system 1500 and neckband 1505 and between augmented-reality system 1500 and controller 1525. The information may be in the form of optical data, electrical data, wireless data, or any other transmittable data form. Moving the processing of information generated by augmented-reality system 1500 to neckband 1505 may reduce weight and heat in eyewear device 1502, making it more comfortable to the user.

Power source 1535 in neckband 1505 may provide power to eyewear device 1502 and/or to neckband 1505. Power source 1535 may include, without limitation, lithium ion batteries, lithium-polymer batteries, primary lithium batteries, alkaline batteries, or any other form of power storage. In some cases, power source 1535 may be a wired power source. Including power source 1535 on neckband 1505 instead of on eyewear device 1502 may help better distribute the weight and heat generated by power source 1535.

As noted, some artificial reality systems may, instead of blending an artificial reality with actual reality, substantially replace one or more of a user's sensory perceptions of the real world with a virtual experience. One example of this type of system is a head-worn display system, such as virtual-reality system 1600 in FIG. 16, that mostly or completely covers a user's field of view. Virtual-reality system 1600 may include a front rigid body 1602 and a band 1604 shaped to fit around a user's head. Virtual-reality system 1600 may also include output audio transducers 1606(A) and 1606(B). Furthermore, while not shown in FIG. 16, front rigid body 1602 may include one or more electronic elements, including one or more electronic displays, one or more inertial measurement units (IMUs), one or more tracking emitters or detectors, and/or any other suitable device or system for creating an artificial-reality experience.

Artificial reality systems may include a variety of types of visual feedback mechanisms. For example, display devices in augmented-reality system 1500 and/or virtual-reality system 1600 may include one or more liquid crystal displays (LCDs), light emitting diode (LED) displays, microLED displays, organic LED (OLED) displays, digital light project (DLP) micro-displays, liquid crystal on silicon (LCoS) micro-displays, and/or any other suitable type of display screen. These artificial reality systems may include a single display screen for both eyes or may provide a display screen for each eye, which may allow for additional flexibility for varifocal adjustments or for correcting a user's refractive error. Some of these artificial reality systems may also include optical subsystems having one or more lenses (e.g., concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial reality systems described herein may include one or more projection systems. For example, display devices in augmented-reality system 1500 and/or virtual-reality system 1600 may include microLED projectors that project light (using, e.g., a waveguide) into display devices, such as clear combiner lenses that allow ambient light to pass through. The display devices may refract the projected light toward a user's pupil and may enable a user to simultaneously view both artificial reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial reality systems may also be configured with any other suitable type or form of image projection system, such as retinal projectors used in virtual retina displays.

The artificial reality systems described herein may also include various types of computer vision components and subsystems. For example, augmented-reality system 1500 and/or virtual-reality system 1600 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial reality system may process data from one or more of these sensors to identify a location of a user, to map the real world, to provide a user with context about real-world surroundings, and/or to perform a variety of other functions.

The artificial reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial reality devices, within other artificial reality devices, and/or in conjunction with other artificial reality devices.

By providing haptic sensations, audible content, and/or visual content, artificial reality systems may create an entire virtual experience or enhance a user's real-world experience in a variety of contexts and environments. For instance, artificial reality systems may assist or extend a user's perception, memory, or cognition within a particular environment. Some systems may enhance a user's interactions with other people in the real world or may enable more immersive interactions with other people in a virtual world. Artificial reality systems may also be used for educational purposes (e.g., for teaching or training in schools, universities, hospitals, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial reality experience in one or more of these contexts and environments and/or in other contexts and environments.

The embodiments disclosed herein may enable or enhance a user's artificial reality experience in one or more of these contexts and environments and/or in other contexts and environments.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference may be made to any claims appended hereto and their equivalents in determining the scope of the present disclosure.

Unless otherwise noted, the terms "connected to" and "coupled to" (and their derivatives), as used in the specification and/or claims, are to be construed as permitting both direct and indirect (i.e., via other elements or components) connection. In addition, the terms "a" or "an," as used in the specification and/or claims, are to be construed as meaning "at least one of." Finally, for ease of use, the terms "including" and "having" (and their derivatives), as used in the specification and/or claims, are interchangeable with and have the same meaning as the word "comprising."

What is claimed is:

1. A method comprising:
locating a lens assembly proximate a functional stack, the lens assembly having a curved surface;
applying a force, by an arrangement of actuators, to the curved surface of the lens assembly using a deformable element comprising a plurality of pogo pins, wherein an amount of force applied by each pogo pin in the plurality of pogo pins is individually controllable by the arrangement of actuators;
adhering the lens assembly to a functional stack using the force to urge the lens assembly against the functional stack to form a laminated combination; and
fabricating an augmented reality or virtual reality device using the laminated combination, wherein:
the functional stack comprises at least one additional lens, at least one polarizer, and at least one beamsplitter.

2. The method of claim 1, further comprising:
receiving a lens prescription for a user; and
fabricating the lens assembly, wherein
the curved surface of the lens assembly has a curvature based on the lens prescription.

3. The method of claim 1, wherein the curved surface is a concave surface or a convex surface.

4. The method of claim 1, wherein applying the force to the curved surface comprises at least partially conforming the deformable element to the curved surface.

5. The method of claim 1, wherein adhering the lens assembly to the functional stack comprises using the force to urge a lens assembly surface of the lens assembly against a functional stack surface of the functional stack.

6. The method of claim 5, wherein the lens assembly surface and the functional stack surface are each planar surfaces.

7. The method of claim 1, wherein:
each of the plurality of pogo pins comprises a material selected from the group consisting of a metal and a polymer.

8. The method of claim 1, wherein urging the plurality of pogo pins comprises mechanical urging or pneumatic urging.

9. The method of claim 1, wherein adhering the lens assembly to a functional stack comprises using the force to urge the lens assembly against the functional stack so that the lens assembly is adhered to the functional stack using an adhesive layer located between the lens assembly and the functional stack.

10. The method of claim 9, wherein the adhesive layer comprises a pressure-sensitive optical adhesive.

11. An apparatus fabricated using the method of claim 1, wherein:
the apparatus is the augmented reality device;
the apparatus further comprises a display;
the laminated combination is configured to direct light from the display to an eye of a user; and
the lens has a lens portion having a lens thickness that is approximately equal to or less than 1 mm.

12. The method of claim 1, wherein each of the plurality of pogo pins comprises a spring.

13. The method of claim 1, wherein each of the plurality of pogo pins comprises a pin section and a resilient portion.

14. The method of claim 13, wherein the arrangement of actuators is configured to individually urge the pin sections of the plurality of pogo pins towards the lens assembly.

15. The method of claim 13, wherein the forces on the lens assembly are applied through the resilient portion to reduce damage to the curved surface.

16. An apparatus comprising:
a sample holder configured to support a lens assembly and a functional stack in positional registration, wherein the lens assembly has a curved surface and a planar surface;
a deformable element comprising a plurality of pogo pins; and
an arrangement of actuators configured to apply a force to the curved surface of the lens assembly using the deformable element to thereby adhere the planar surface of the lens assembly to a surface of the functional stack, wherein an amount of force applied by each pogo pin in the plurality of pogo pins is individually controlled by the arrangement of actuators.

17. The apparatus of claim 16, wherein:
the apparatus comprises an augmented reality device; and
the functional stack comprises at least one lens, at least one beamsplitter, and at least one polarizer.

18. The apparatus of claim 16, wherein each of the plurality of pogo pins comprises a spring.

19. The apparatus of claim 16, wherein each of the plurality of pogo pins comprises a pin section and a resilient portion.

20. The apparatus of claim 19, wherein the arrangement of actuators is configured to individually urge the pin sections of the plurality of pogo pins towards the lens assembly.

* * * * *